US011933569B1

(12) United States Patent
Chernik et al.

(10) Patent No.: US 11,933,569 B1
(45) Date of Patent: Mar. 19, 2024

(54) ADJUSTABLE SUPPORT STAND

(71) Applicant: New Revo Brand Group, LLC, Plymouth, MN (US)

(72) Inventors: Ryan Chernik, New Brighton, MN (US); Matthew C. Morris, Minneapolis, MN (US); Ryan Jacobson, Andover, MN (US); Mike Rhode, Coon Rapids, MN (US)

(73) Assignee: New Revo Brand Group, LLC, Plymouth, MN (US)

( * ) Notice: Subject to any disclaimer, the term of this patent is extended or adjusted under 35 U.S.C. 154(b) by 0 days.

(21) Appl. No.: 18/152,247

(22) Filed: Jan. 10, 2023

(51) Int. Cl.
| | | |
|---|---|---|
| *A47B 81/00* | (2006.01) | |
| *A47B 43/00* | (2006.01) | |
| *A47F 7/00* | (2006.01) | |
| *B60R 7/14* | (2006.01) | |
| *F41A 23/18* | (2006.01) | |

(52) U.S. Cl.
CPC .............. *F41A 23/18* (2013.01); *A47B 43/00* (2013.01); *A47B 81/005* (2013.01); *A47F 7/0035* (2013.01); *B60R 7/14* (2013.01)

(58) Field of Classification Search
CPC . F41A 23/18; B60R 7/14; A47B 81/00; A47B 81/005; A47B 43/00; A47B 45/00; A47F 7/0028; A47F 7/0035; A47F 5/10
USPC ............ 211/64, 85.7, 43, 1.3, 2, 195; 42/94; 206/317; 224/913
See application file for complete search history.

(56) References Cited

U.S. PATENT DOCUMENTS

| 410,414 | A | * | 9/1889 | Hall, Sr. ................. | B25B 5/006 |
| | | | | | 269/45 |
| 945,877 | A | * | 1/1910 | Updegraff .............. | A47B 65/00 |
| | | | | | 211/40 |
| 1,049,726 | A | * | 1/1913 | Johnson .................. | D06F 57/08 |
| | | | | | 211/11 |
| 1,205,149 | A | | 11/1916 | Bovee | |

(Continued)

FOREIGN PATENT DOCUMENTS

| CN | 104117938 A | 10/2014 |
| CN | 104889768 A | 9/2015 |

(Continued)

OTHER PUBLICATIONS

Global Industrial, Plano Molding 191900 110 Quart Mobile Storage Trunk, https://www.globalindustrial.com/p/plano-110-quart-mobile-storage-trunk-38-1-4-I-x-18-1-2-w-x-21-3-4-h-black?infoParam.campaignId=T9F&gclid=CjwKCAiAqt-dBhBcEiwATw-ggDCai7CnjDTc1ING1mZwCRoSpctSC2fMgT9FtWurk6j6j6y8x1UA7BoC2zMQAvD_BwE, accessed Jan. 6, 2023.

(Continued)

*Primary Examiner* — Jennifer E. Novosad
(74) *Attorney, Agent, or Firm* — GRUMBLES LAW PLLC; Brittany Haanan

(57) ABSTRACT

An adjustable support stand can include a front support on a first end of the adjustable support stand having a grip comprised of a first, front support material; and a rear support on an opposing, second end of the adjustable support stand having a grip comprised of a first, rear support material, wherein the front and the rear supports can each have at least two vertical arms, at least one of the supports can have vertically stacked chevron voids on each arm, and the chevron voids can be deformable by the object being worked upon to secure and grip the object in place.

16 Claims, 19 Drawing Sheets

(56) References Cited

U.S. PATENT DOCUMENTS

| | | | | |
|---|---|---|---|---|
| 1,237,101 | A | * | 8/1917 | Ryan ..................... A47B 65/20 211/43 |
| 1,401,171 | A | * | 12/1921 | Manny ................. A47B 23/044 248/448 |
| 2,258,686 | A | | 10/1941 | Olney |
| 2,290,545 | A | | 7/1942 | Doering |
| 2,519,107 | A | | 8/1950 | Brown |
| 2,731,829 | A | * | 1/1956 | Wigington et al. ...... F41A 23/16 73/167 |
| 2,774,563 | A | | 12/1956 | Pribis |
| 2,778,257 | A | | 1/1957 | Linskey et al. |
| 2,783,896 | A | * | 3/1957 | Agostini .................... B60R 7/14 224/567 |
| 2,877,689 | A | | 3/1959 | Pribis |
| 3,261,521 | A | * | 7/1966 | Meccico ................... B60R 7/14 224/571 |
| 3,361,265 | A | * | 1/1968 | Wernimont .......... A47B 81/005 248/176.1 |
| 3,477,586 | A | * | 11/1969 | Lawrence ............ A47B 81/005 224/571 |
| 3,648,909 | A | * | 3/1972 | Wisecarver ........ B65D 21/0226 294/169 |
| 3,805,608 | A | * | 4/1974 | Schmidt .................. F41A 23/16 89/44.01 |
| 3,861,695 | A | * | 1/1975 | Shourek ................. B62B 1/125 211/195 |
| 3,910,382 | A | * | 10/1975 | Justice .................... F41A 23/18 187/401 |
| 3,964,613 | A | * | 6/1976 | Anderson, Jr. ......... F41A 29/00 312/902 |
| 3,984,092 | A | | 10/1976 | Fitzpatrick |
| 4,333,385 | A | | 6/1982 | Culver |
| 4,438,913 | A | | 3/1984 | Hylla |
| 4,548,392 | A | | 10/1985 | Rickling |
| 4,594,805 | A | | 6/1986 | McClelland |
| 4,595,106 | A | * | 6/1986 | Kunze .................... B65G 9/002 211/195 |
| 4,776,471 | A | * | 10/1988 | Elkins .................... A47B 57/52 224/482 |
| 4,807,381 | A | | 2/1989 | Southard |
| 4,823,673 | A | * | 4/1989 | Downing ................ F41A 23/34 89/37.04 |
| 4,824,086 | A | | 4/1989 | Rickling et al. |
| 4,873,777 | A | * | 10/1989 | Southard .............. A47B 81/005 211/64 |
| 4,893,850 | A | | 1/1990 | Mizusawa |
| 4,905,550 | A | | 3/1990 | Albrecht |
| 4,926,722 | A | | 5/1990 | Sorensen et al. |
| 4,961,505 | A | * | 10/1990 | Moeller ................. A47F 7/0035 211/69.8 |
| 4,985,962 | A | | 1/1991 | Weber |
| 5,016,893 | A | * | 5/1991 | Hart, Jr. .................. F16B 12/32 211/195 |
| 5,025,584 | A | | 6/1991 | Butterwick |
| 5,058,302 | A | * | 10/1991 | Minneman ............. F41A 23/18 206/315.11 |
| 5,070,636 | A | | 12/1991 | Mueller |
| 5,078,309 | A | * | 1/1992 | Hull ....................... B60R 21/026 224/571 |
| 5,094,131 | A | | 3/1992 | Sorensen et al. |
| 5,210,906 | A | | 5/1993 | Aihara et al. |
| 5,228,578 | A | * | 7/1993 | Wu ........................ A47B 65/20 211/175 |
| D340,851 | S | | 11/1993 | Sorensen |
| 5,295,596 | A | * | 3/1994 | Squitieri ................ A47B 45/00 211/175 |
| 5,439,152 | A | * | 8/1995 | Campbell ................ B60R 9/00 211/195 |
| 5,497,575 | A | | 3/1996 | Fried |
| 5,593,147 | A | | 1/1997 | Read |
| 5,595,333 | A | * | 1/1997 | Boston .................... B60R 7/14 224/532 |
| 5,600,913 | A | * | 2/1997 | Minneman ............... F41A 23/06 248/125.3 |
| 5,640,944 | A | * | 6/1997 | Minneman ................ F41B 5/14 206/315.11 |
| 5,697,180 | A | | 12/1997 | Morizio |
| 5,755,342 | A | * | 5/1998 | Hoffman ............... A47B 81/005 248/156 |
| 5,853,168 | A | | 12/1998 | Drake |
| 5,988,616 | A | | 11/1999 | Fuller et al. |
| 6,029,964 | A | | 2/2000 | Bohl |
| 6,098,498 | A | | 8/2000 | Ming et al. |
| D439,487 | S | | 3/2001 | Renner |
| 6,305,117 | B1 | | 10/2001 | Hales |
| 6,338,475 | B1 | | 1/2002 | Ping |
| 6,347,791 | B1 | | 2/2002 | Chervenak |
| 6,367,466 | B1 | | 4/2002 | Nettles, Jr. |
| 6,367,787 | B1 | | 4/2002 | Poole et al. |
| 6,382,608 | B1 | | 5/2002 | Michell |
| 6,386,530 | B1 | | 5/2002 | Marks |
| 6,412,767 | B1 | | 7/2002 | Beckmann et al. |
| 6,427,376 | B1 | * | 8/2002 | Weber ..................... A01K 97/01 248/538 |
| 6,546,662 | B1 | * | 4/2003 | Chong ..................... F41A 23/16 42/94 |
| 6,648,315 | B1 | | 11/2003 | Lee |
| 6,676,120 | B1 | | 1/2004 | Hallbeck et al. |
| 6,685,176 | B2 | | 2/2004 | Wirth et al. |
| 6,761,278 | B2 | | 7/2004 | Hyp et al. |
| 6,834,454 | B2 | * | 12/2004 | Klein ........................ B60R 7/14 42/70.11 |
| 6,860,055 | B1 | | 3/2005 | Walrath |
| 6,877,266 | B1 | | 4/2005 | Brownlee |
| 6,896,248 | B1 | | 5/2005 | Andulics |
| 6,929,223 | B2 | * | 8/2005 | Hancock ................. F16M 13/00 224/462 |
| 6,929,253 | B2 | | 8/2005 | Marks |
| 6,957,808 | B2 | | 10/2005 | Varzino et al. |
| 7,004,365 | B2 | | 2/2006 | Ingram |
| 7,017,898 | B2 | | 3/2006 | Varzino et al. |
| 7,066,457 | B2 | | 6/2006 | Gerritsen et al. |
| 7,083,055 | B1 | * | 8/2006 | Ambrosat .......... A63B 71/0036 211/38 |
| 7,168,181 | B2 | | 1/2007 | Walchak |
| D543,604 | S | | 5/2007 | Minneman |
| 7,258,333 | B2 | | 8/2007 | Hobday |
| 7,281,346 | B1 | * | 10/2007 | Cook ....................... F41A 23/02 206/315.11 |
| 7,356,960 | B1 | | 4/2008 | Knitt |
| 7,367,451 | B2 | | 5/2008 | Pendergraph et al. |
| 7,370,891 | B1 | | 5/2008 | Schmitt et al. |
| 7,503,459 | B2 | * | 3/2009 | Grayson ............... A47B 81/005 211/70.8 |
| 7,530,556 | B1 | | 5/2009 | Zheng |
| 7,537,218 | B2 | | 5/2009 | Wachtler et al. |
| 7,584,690 | B2 | | 9/2009 | Cauley |
| 7,600,744 | B2 | | 10/2009 | Liou |
| 7,641,183 | B2 | | 1/2010 | Fuller et al. |
| 7,651,078 | B2 | | 1/2010 | Geier et al. |
| 7,699,297 | B2 | | 4/2010 | Cicenas et al. |
| 7,726,478 | B2 | | 6/2010 | Potterfield et al. |
| 7,735,813 | B2 | | 6/2010 | Geier et al. |
| 7,774,972 | B2 | | 8/2010 | Potterfield et al. |
| 7,815,175 | B2 | | 10/2010 | Cicenas et al. |
| 7,886,474 | B2 | | 2/2011 | Werner |
| 7,896,322 | B2 | | 3/2011 | Geier et al. |
| 7,942,392 | B2 | | 5/2011 | Geier et al. |
| 7,946,071 | B2 | | 5/2011 | Cauley |
| 7,984,895 | B2 | | 7/2011 | Strauss et al. |
| 7,997,021 | B2 | | 8/2011 | Cauley et al. |
| 8,011,129 | B2 | | 9/2011 | Cauley et al. |
| 8,074,340 | B2 | | 12/2011 | Cicenas et al. |
| 8,240,647 | B2 | | 8/2012 | Geier et al. |
| 8,296,988 | B2 | | 10/2012 | Yale et al. |
| 8,297,605 | B2 | | 10/2012 | Lee et al. |
| 8,342,495 | B2 | | 1/2013 | Weissenborn |
| 8,382,048 | B2 | | 2/2013 | Nesper et al. |
| 8,393,106 | B2 | | 3/2013 | Cauley et al. |
| 8,424,856 | B2 | | 4/2013 | Lombardi et al. |

(56) References Cited

U.S. PATENT DOCUMENTS

| | | | |
|---|---|---|---|
| 8,430,383 B2 | 4/2013 | Strauss | |
| 8,479,928 B2* | 7/2013 | Tanabe | A63B 71/0045 |
| | | | 211/186 |
| 8,516,734 B2* | 8/2013 | Yale | F41C 33/06 |
| | | | 73/167 |
| 8,534,519 B2* | 9/2013 | Hancock | B62J 7/08 |
| | | | 224/558 |
| 8,544,202 B2 | 10/2013 | Bastian, Jr. | |
| 8,578,645 B2 | 11/2013 | Cauley | |
| 8,590,871 B2 | 11/2013 | Geier et al. | |
| 8,621,773 B2 | 1/2014 | Morrow et al. | |
| D698,888 S | 2/2014 | Hicks | |
| 8,651,289 B2* | 2/2014 | Diaz, Jr. | A01K 97/08 |
| | | | 206/315.11 |
| 8,651,293 B2* | 2/2014 | Boyer | B25H 3/04 |
| | | | 211/195 |
| 8,657,127 B2 | 2/2014 | Diaz, Jr. et al. | |
| 8,702,076 B2 | 4/2014 | Cicenas et al. | |
| 8,905,391 B2 | 12/2014 | Weissenborn | |
| 8,931,193 B1 | 1/2015 | Bogart et al. | |
| 8,931,201 B2 | 1/2015 | Gianladis et al. | |
| 8,973,297 B2 | 3/2015 | Boggess et al. | |
| 9,004,479 B2 | 4/2015 | Fisher | |
| 9,134,635 B2 | 9/2015 | Tucker et al. | |
| 9,140,512 B2 | 9/2015 | Witchel | |
| 9,151,561 B2 | 10/2015 | Morrow et al. | |
| 9,187,210 B2 | 11/2015 | Zhu et al. | |
| 9,216,485 B2 | 12/2015 | Huang | |
| 9,250,034 B2 | 2/2016 | Tucker et al. | |
| 9,302,374 B1 | 4/2016 | Cusenza | |
| 9,421,672 B2 | 8/2016 | Rowlay et al. | |
| 9,522,456 B2 | 12/2016 | Cicenas et al. | |
| 9,618,291 B1 | 4/2017 | Henderson | |
| 9,676,079 B2 | 6/2017 | Tropea | |
| 9,702,653 B2 | 7/2017 | Cauley, Jr. et al. | |
| 9,733,036 B2 | 8/2017 | Tucker et al. | |
| 9,861,087 B1* | 1/2018 | Arrazola | B62B 3/005 |
| 9,885,534 B2 | 2/2018 | Boggess et al. | |
| 9,933,226 B2 | 4/2018 | Tucker et al. | |
| 9,976,693 B1 | 5/2018 | Delikat et al. | |
| 9,995,552 B2 | 6/2018 | Cuddeback | |
| 10,011,005 B2 | 7/2018 | Shute et al. | |
| 10,040,172 B2 | 8/2018 | Weissenborn | |
| 10,178,209 B1 | 1/2019 | Hesse | |
| 10,209,023 B1 | 2/2019 | Stuart | |
| 10,317,162 B2 | 6/2019 | Morrow et al. | |
| 10,321,758 B2* | 6/2019 | Martinage | A47B 43/00 |
| 10,514,225 B2* | 12/2019 | Cauley, Jr. | F41A 23/16 |
| 10,563,945 B2 | 2/2020 | Tucker et al. | |
| 10,684,090 B2 | 6/2020 | Agnelli, Jr. | |
| 10,782,085 B2 | 9/2020 | Cauley, Jr. et al. | |
| 10,858,160 B2 | 12/2020 | Yang | |
| 10,859,336 B2 | 12/2020 | Morrow et al. | |
| 10,890,406 B1 | 1/2021 | Whang | |
| 10,919,141 B2 | 2/2021 | Omry et al. | |
| 11,009,306 B2 | 5/2021 | Cauley, Jr. et al. | |
| 11,079,195 B2 | 8/2021 | Silver et al. | |
| 11,091,103 B2* | 8/2021 | Winkler | B60R 11/06 |
| 11,274,903 B2 | 3/2022 | Kokoruda et al. | |
| 11,493,299 B2 | 11/2022 | Jacobson et al. | |
| 11,607,039 B1* | 3/2023 | Thacker | A47B 81/005 |
| 2002/0043752 A1 | 4/2002 | Reed et al. | |
| 2003/0160373 A1 | 11/2003 | Yang | |
| 2005/0045569 A1* | 3/2005 | Chang | A47B 43/00 |
| | | | 211/11 |
| 2005/0115137 A1 | 6/2005 | Minneman | |
| 2005/0230334 A1 | 10/2005 | MacDonald et al. | |
| 2006/0201898 A1* | 9/2006 | Hughes | B60R 7/14 |
| | | | 211/64 |
| 2006/0226588 A1 | 10/2006 | Khachatoorian et al. | |
| 2007/0294929 A1 | 12/2007 | Potterfield et al. | |
| 2008/0053936 A1* | 3/2008 | Seehoff | A47G 25/0685 |
| | | | 211/104 |
| 2008/0217276 A1* | 9/2008 | Brady | B65D 19/12 |
| | | | 211/195 |
| 2008/0237168 A1* | 10/2008 | Harpole | B65D 19/12 |
| | | | 211/195 |
| 2009/0159540 A1* | 6/2009 | Meeks | F41A 23/18 |
| | | | 211/64 |
| 2009/0193703 A1 | 8/2009 | Riley | |
| 2010/0089294 A1 | 4/2010 | Medina | |
| 2010/0126055 A1* | 5/2010 | Potterfield | F41A 23/16 |
| | | | 206/505 |
| 2011/0192069 A1 | 8/2011 | Potterfield et al. | |
| 2012/0037579 A1* | 2/2012 | Muldoon | F41A 23/18 |
| | | | 211/64 |
| 2013/0086835 A1 | 4/2013 | Minneman | |
| 2014/0246824 A1 | 9/2014 | Fiegener et al. | |
| 2014/0319147 A1 | 10/2014 | Horovitz et al. | |
| 2015/0354913 A1 | 12/2015 | Morrow et al. | |
| 2017/0216997 A1 | 11/2017 | Smith et al. | |
| 2019/0162499 A1 | 11/2019 | Jacobson | |
| 2021/0170549 A1 | 6/2021 | Wang | |
| 2022/0281076 A1 | 9/2022 | Morris et al. | |

FOREIGN PATENT DOCUMENTS

| | | |
|---|---|---|
| CN | 111113099 A | 5/2020 |
| DE | 3700955 C2 | 10/1991 |
| DE | 102018005857 A1 | 1/2020 |
| FR | 3032784 A1 | 8/2016 |
| JP | 3211200 U | 6/2017 |
| TW | I417503 B | 12/2013 |
| WO | 2017088030 A1 | 6/2017 |

OTHER PUBLICATIONS

Husky, 20-Gal. Professional Duty Waterproof Storage Container with Hinged Lid in Red, https://www.homedepot.com/p/Husky-20-Gal-Professional-Duty-Waterproof-Storage-Container-with-Hinged-Lid-in-Red-246842/311485319, accessed Jan. 5, 2023.

Lyman, Revolution Rotating Gun Vise, https://www.sportsmansguide.com/product/index/lyman-revolution-rotating-gun-vise?a=471500, accessed Jul. 28, 2020.

Modul-System, Multi-Box—The 'Smart' Multi-Purpose Tool Box, https://www.modul-system.com/en/news/2019/april/multi-box-the-smart-multi-purpose-tool-box-1658, accessed Jan. 6, 2023.

MTM Case-Gard, GV30—Gun Vise for Gunsmithing work and Cleaning Kits, https://mtmcase-gard.com/products/gun-vise-for-gunsmithing-work-and-cleaning-kits, accessed Jan. 6, 2023.

MTM Case-Gard, RMBC-11 - Shooting Range Box & Maintenance Center, https://mtmcase-gard.com/products/shooting-range-box-n-maintenance-center, accessed Jan. 6, 2023.

Plano Store UK, Camo Storage and Gun Cleaning Shooters Case, https://www.planostore.com/gun-cleaning-station-and-storage-system-shooters-case, accessed Nov. 14, 2022.

Tipton, Compact Range Vise, https://www.tiptonclean.com/gun-vises/compact-range-vise/282282.html, accessed Nov. 14, 2022.

Tipton, Gun Vise, https://www.tiptonclean.com/gun-vises/gun-vise/782731.html, accessed Jan. 6, 2023.

Amazon, Gun Fit Jaws, Retrieved from: https://www.amazon.com/s?k=gun+fit+jaws&hvadid=634501801402&hvdev=c&hvlocphy=1018671&hvnetw=g&hvqmt=e&hvrand=13330848230366123960&hvtargid=kwd- (Year: 2023).

Master Gun Vise™ Gun-Fit™ (from Real Avid), Retrieved from: https://www.youtube.com/watch?v=Azx8037Vja8 (Year: 2022).

Office Action pertaining to corresponding U.S. Appl. No. 17/455,034, dated Dec. 12, 2023.

Panavise, Deluxe Jaw Pads; Found at: https://web.archive.org/web/20100322210148/https://www.panavise.com/index.html?pagel D=1&id 1 = 1 &startat= 1 &—woSECTIONSdatarq=1 &—SECTIONSword=ww (Year: 2010).

PanaVise-346-datasheet Catalogue (Year: 2023).

* cited by examiner

US 11,933,569 B1

ADJUSTABLE SUPPORT STAND

FIELD OF THE INVENTION

This disclosure relates to support stands, and more particularly, relates to support stands that are adjustable and can support firearms.

BACKGROUND OF THE INVENTION

During maintenance activities, devices like firearms (or sub-components thereof) are often held or otherwise supported by supports, clamps, jigs, vises, or other mechanical support arrangements. This can free up an armorer's hands for performing maintenance tasks and can enable greater application of torque to components than, for example, handholding. In some cases, armorers require a support having enough malleability and friction to allow for the support to both grip the firearm and deform to the firearms dimensions in order to hold it in place. Further, armorers may require compact storage for a support, a firearm may require cleaning or maintenance when away from a user's primary space, an armorer may require the support to be height, length, or width adjustable, and an armorer may require that the object being worked upon be clamped in place. Therefore, it is desirable to provide a support that are adjustable and can provide secure support for objects being worked upon during maintenance activities.

SUMMARY OF THE INVENTION

This disclosure relates to support stands, and more particularly, relates to grips and adjustable features of support stands. In an illustrative but non-limiting example, the disclosure provides an adjustable support stand that can include a front support on a first end of the adjustable support stand and a rear support on an opposing, second end of the adjustable support stand. The front support can have a grip comprised of a first, front support material. The rear support can have a grip comprised of a first, rear support material. The front and rear supports can each have at least two vertical arms, and at least one of the supports can have vertically stacked chevron voids on each arm. The chevron voids can be deformable by the object being worked upon to secure and grip the object in place.

The above summary is not intended to describe each and every example or every implementation of the disclosure. The Description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

Figure 1:
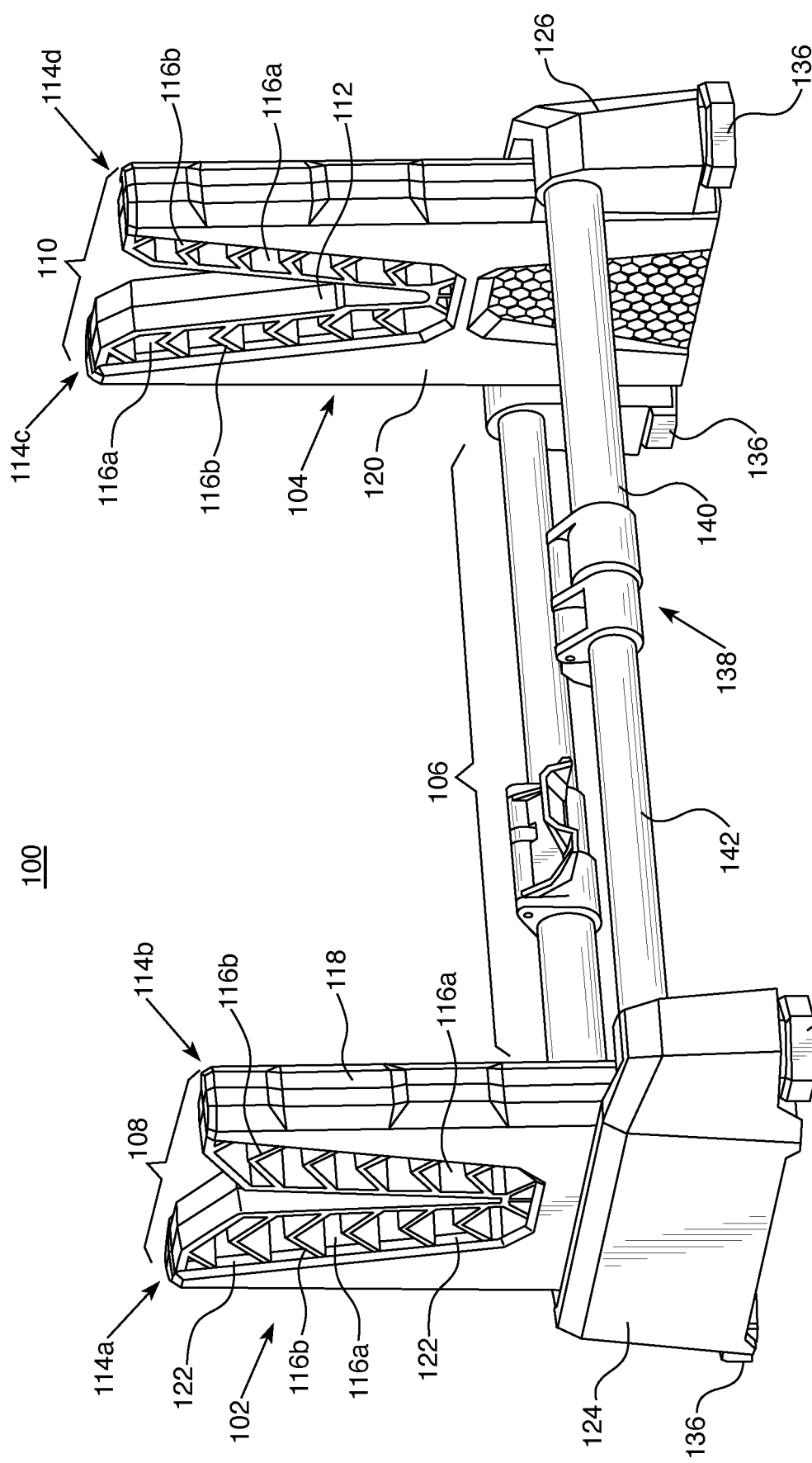
FIG. 1 is a perspective view of an adjustable support stand.

The present disclosure relates to support stands, and more particularly, relates to support stands that are adjustable and can support firearms. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Figure 11:
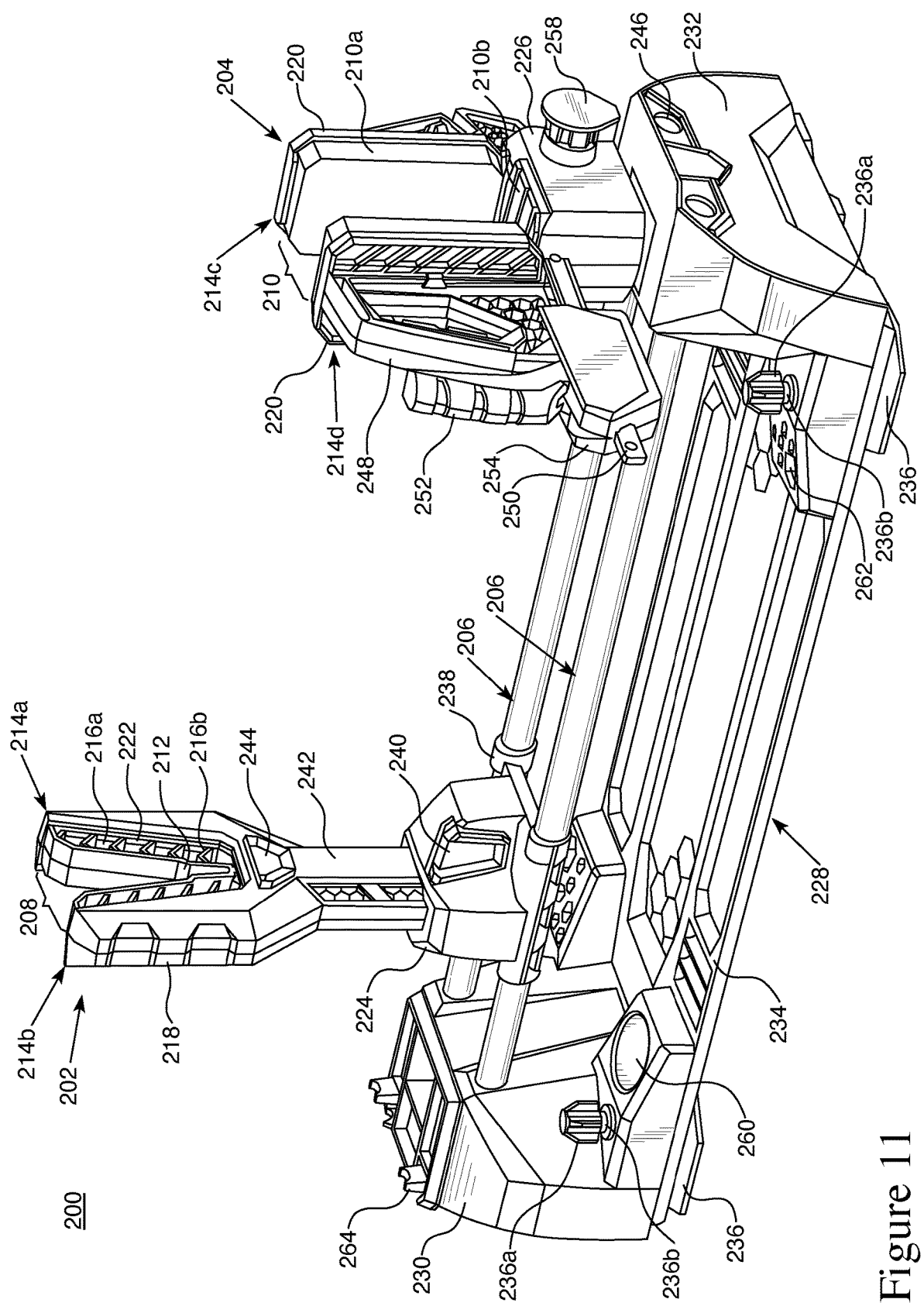
FIG. 11 is a perspective view of a second embodiment of an adjustable support stand.
Figure 20:
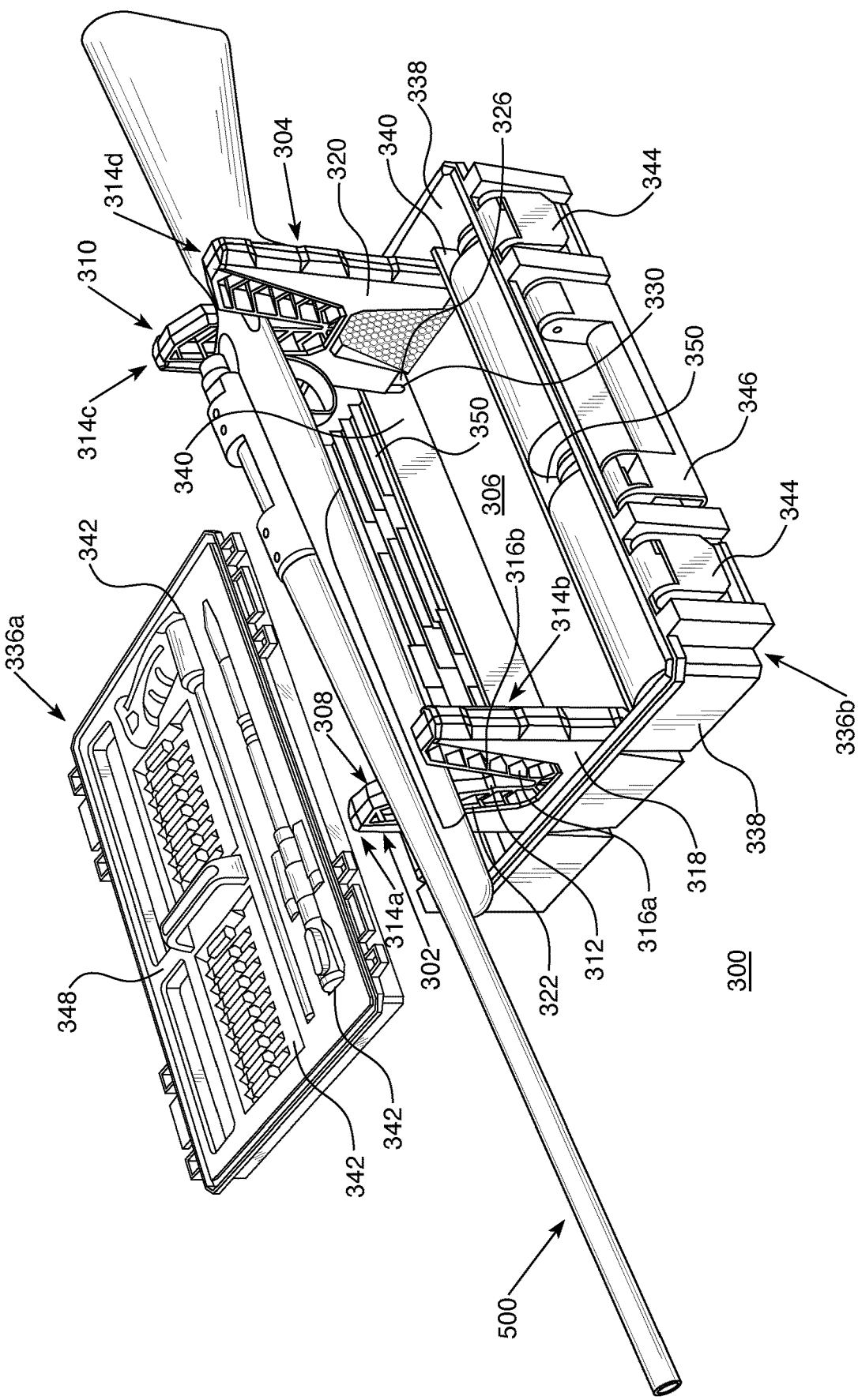
FIG. 20 is a perspective view of a third embodiment of an adjustable support stand.

FIGS. 1, 11 and 20 are perspective views of illustrative examples of an adjustable support stand of the present disclosure. The adjustable support stand may include a front support and a rear support. Further, the adjustable support stand may include rails, which may be static or telescoping rails. The front support can be comprised of a front grip, which can be a portion of a pair of vertical arms (or the entire arms themselves) and can include chevron voids. The front grip may be positioned in a front housing, which may further include a front base. Similarly, the rear support can be comprised of a rear grip, which can be a portion of a pair of vertical arms (or the entire arms themselves) and can include chevron voids. Alternatively, the rear grip in the pair of vertical arms can be solid and without chevron voids. The rear grip may be positioned in a rear housing, which may further include a rear base. Note that due to the ambidextrous nature of the device (a firearm or other elongated object can be placed in either of two directions depending on the needs of the user), the terms "front" and "rear", when used herein, can be used interchangeably. Therefore, for example, a feature present on the "rear grip" is not limited to the rear of the device; it can be assumed to alternatively be present on the "front grip." Further, what is indicated as a "rear grip in a rear housing" may, in fact, be used in practice as the front of the device. The telescoping rails can include a locking mechanism, which can lock the telescoping rails in place and can lock the front support and the rear support in a collapsed position, as described further herein.

Figure 2:
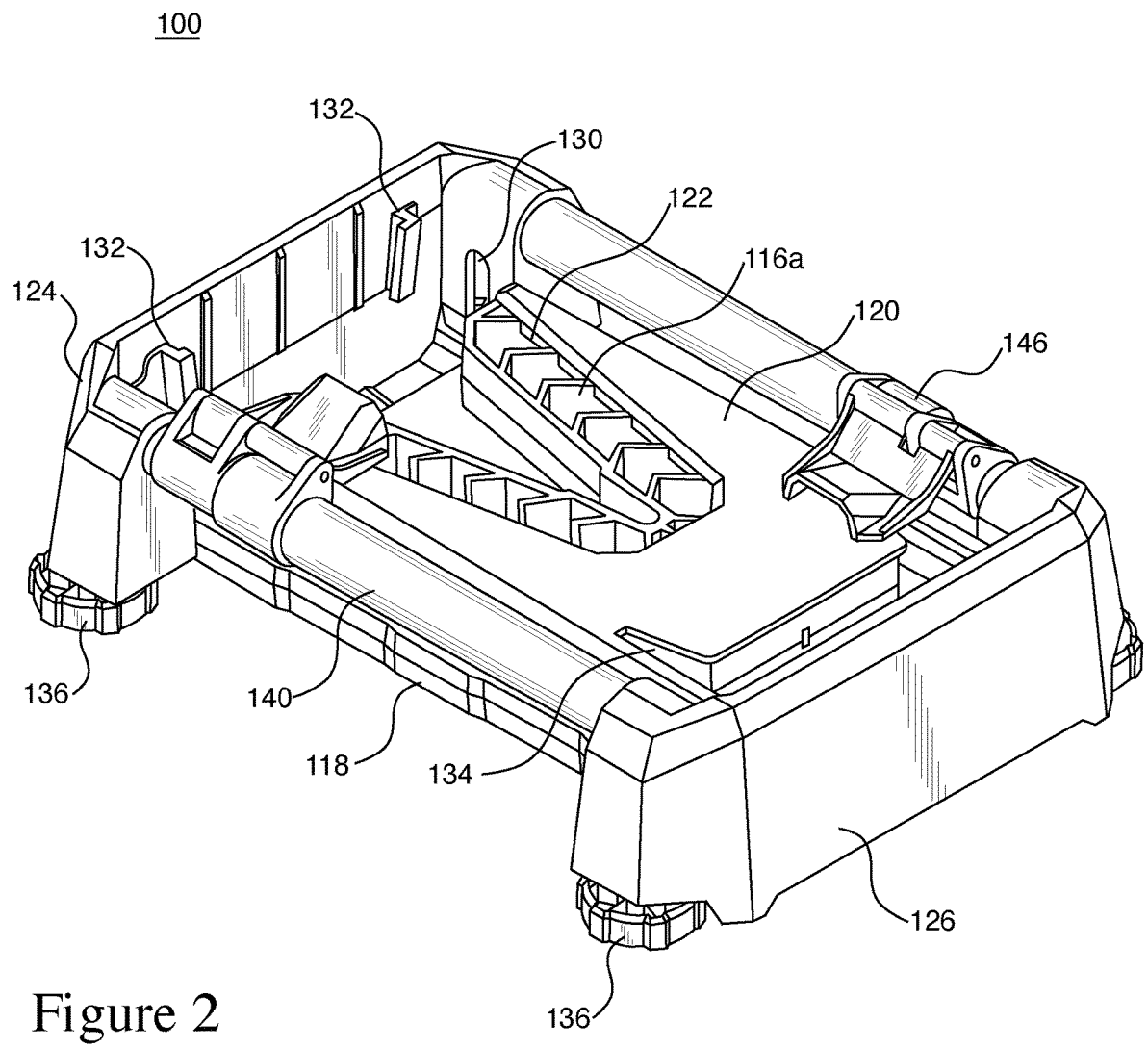
FIG. 2 is a perspective view of the adjustable support stand of FIG. 1 in a collapsed configuration.
Figure 3:
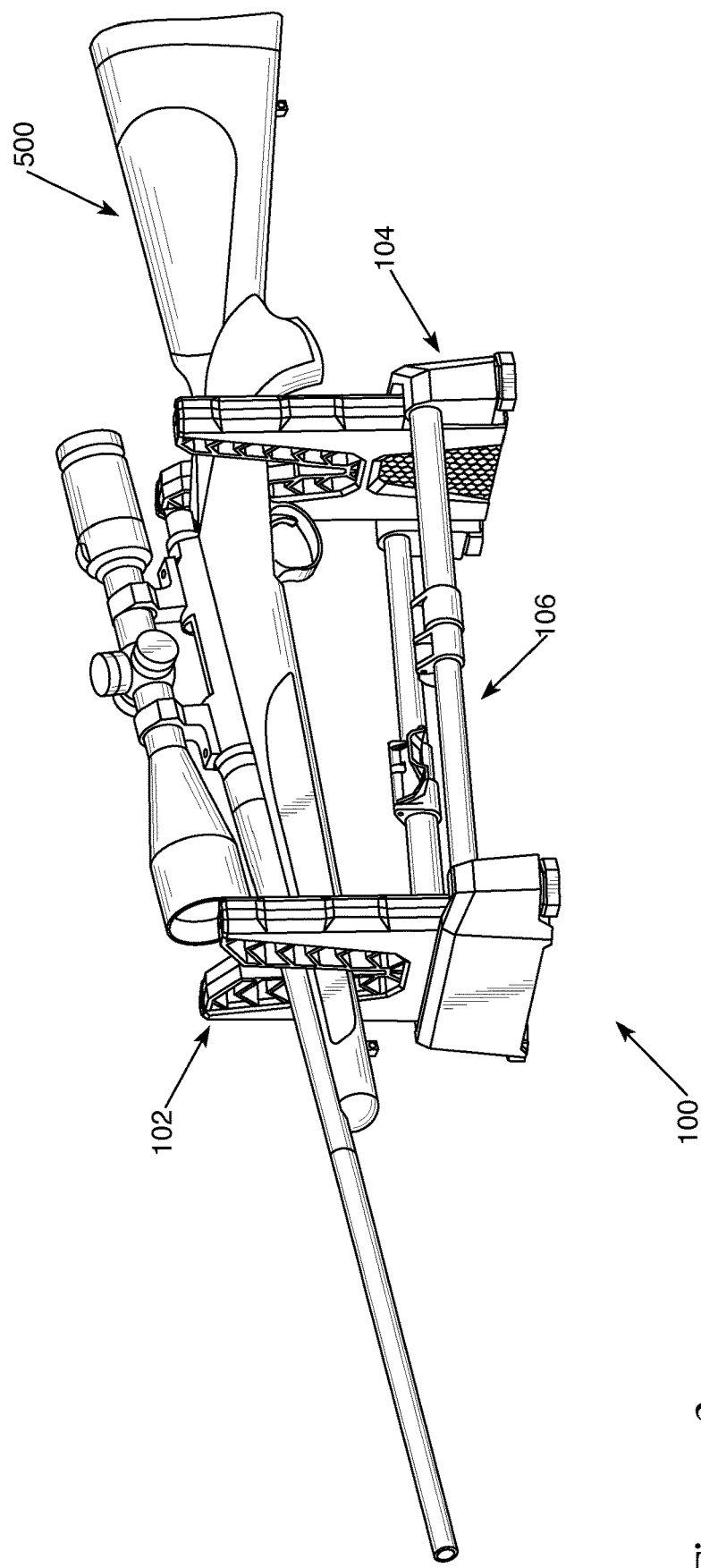
FIG. 3 is a perspective view of a firearm secured in the adjustable support stand of FIG. 1.
Figure 4:
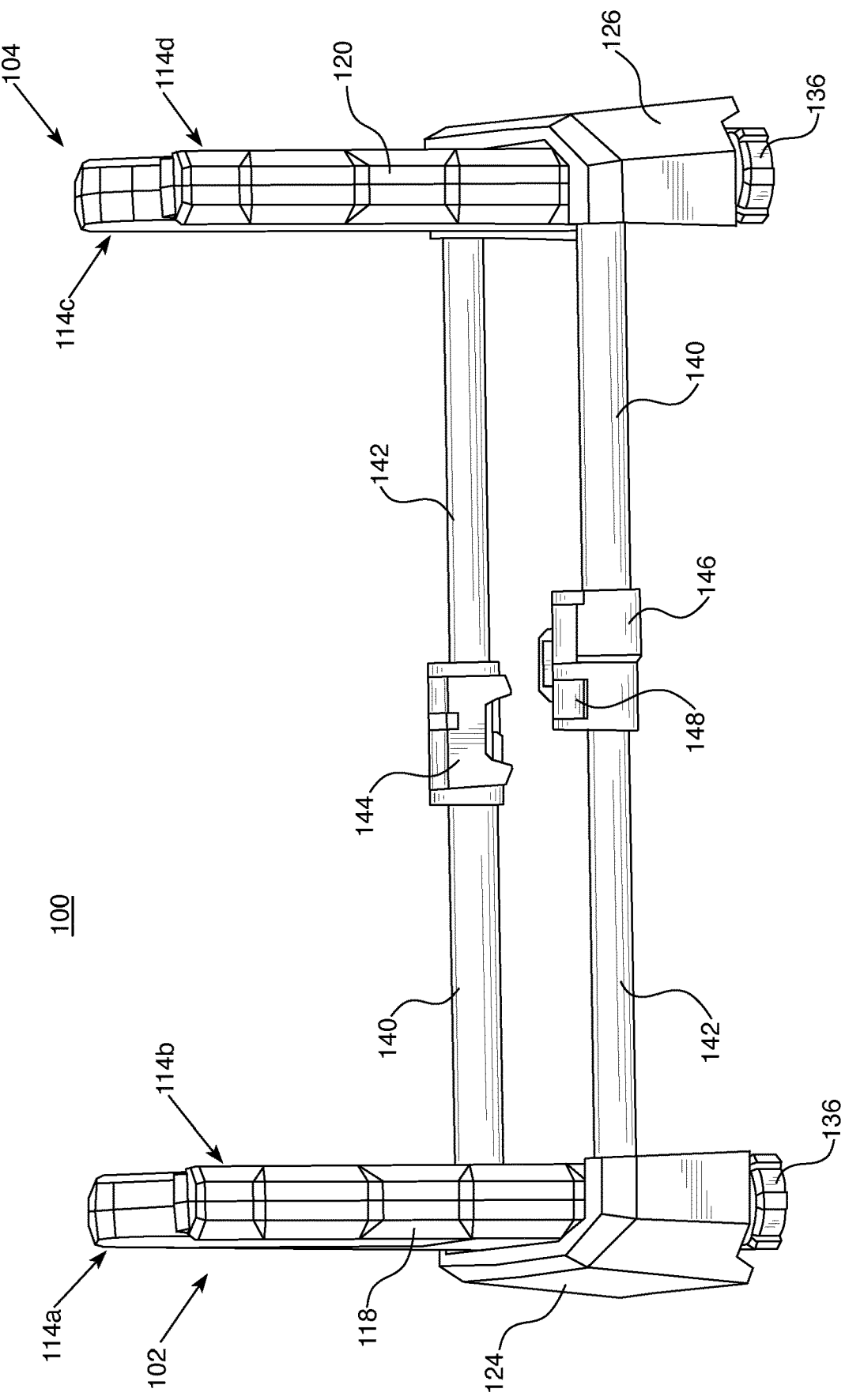
FIG. 4 is a perspective side view of the adjustable support stand of FIG. 1.
Figure 5:
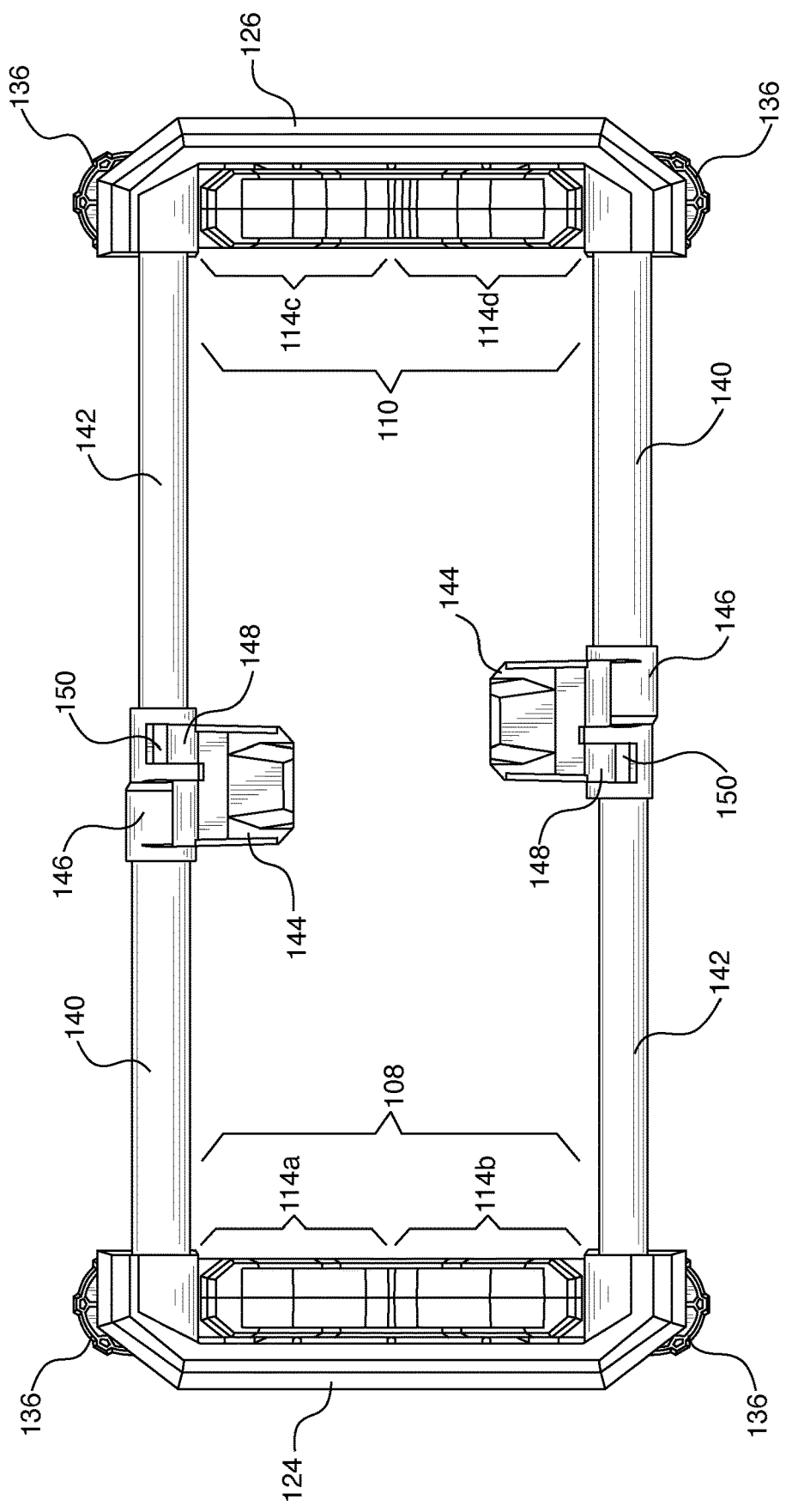
FIG. 5 is a top plan view of the adjustable support stand of FIG. 1.
Figure 6:
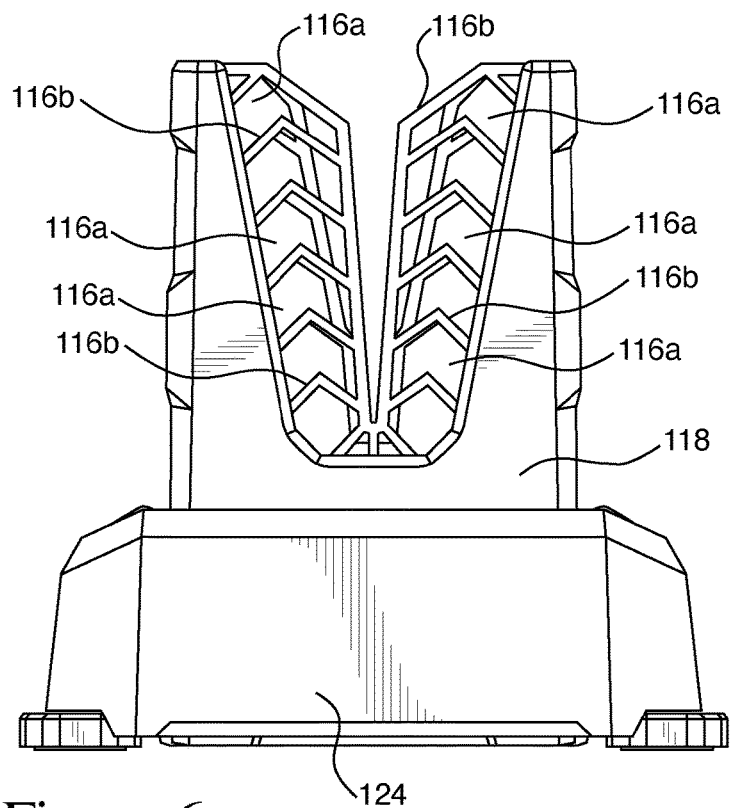
FIG. 6 is a front elevational view of the adjustable support stand of FIG. 1.
Figure 7:
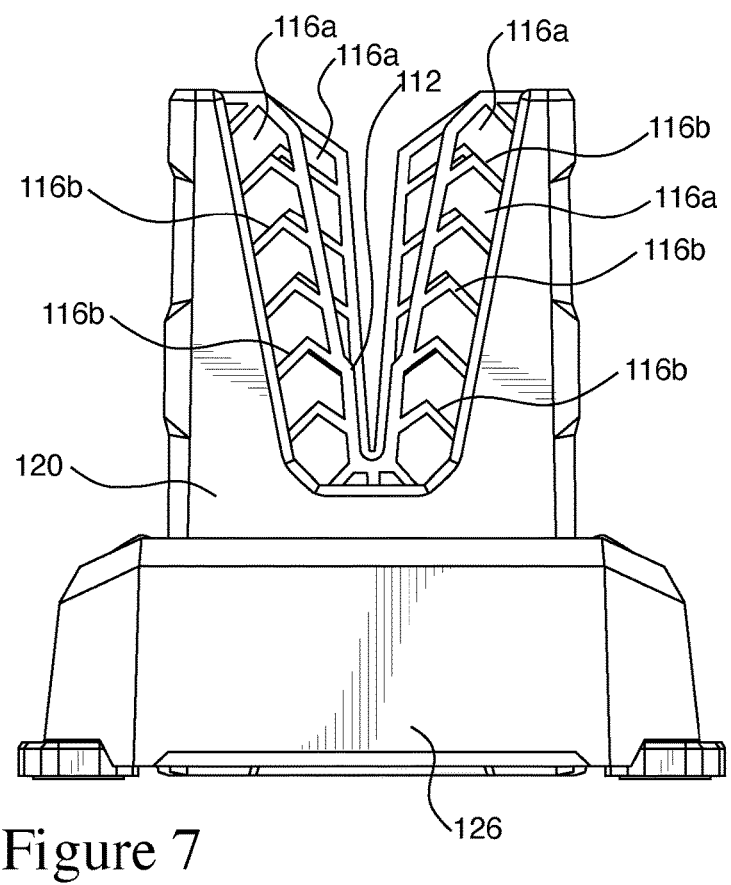
FIG. 7 is a rear elevational view of the adjustable support stand of FIG. 1.
Figure 8:
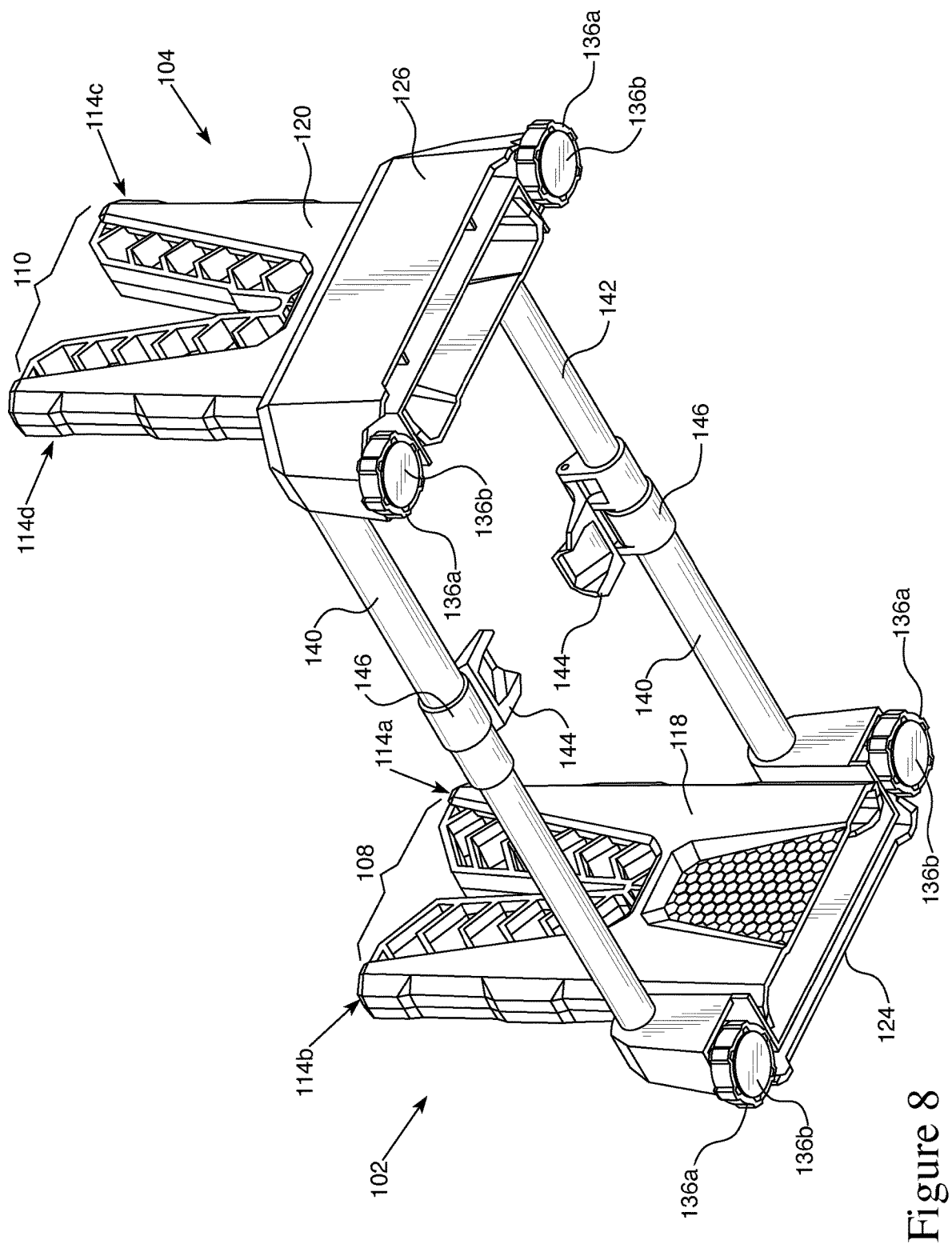
FIG. 8 is a bottom perspective view of the adjustable support stand of FIG. 1.
Figure 9:
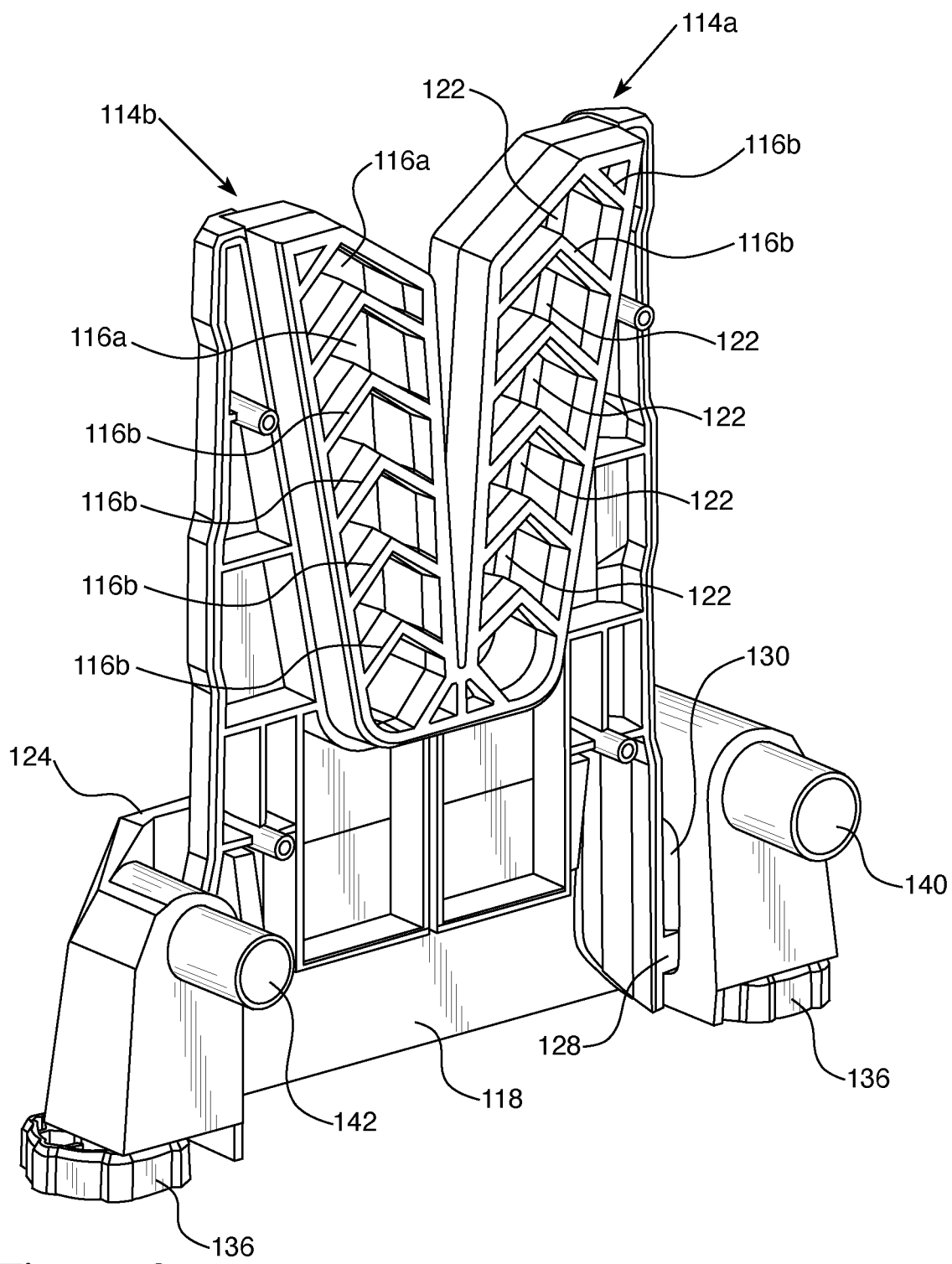
FIG. 9 is a cross-sectional view of the adjustable support stand of FIG. 1.
Figure 10:
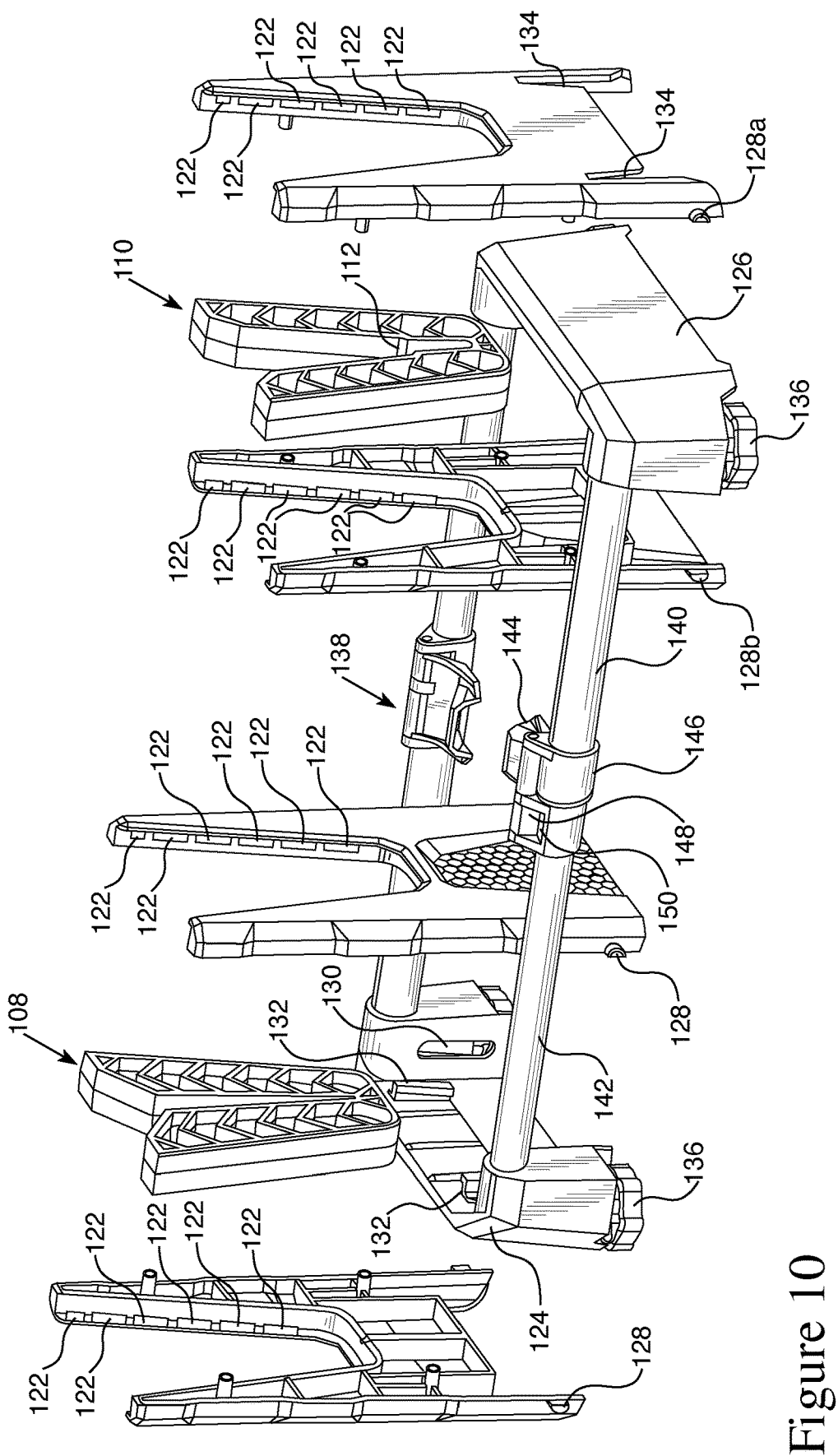
FIG. 10 is an exploded view of the adjustable support stand of FIG. 1.
Figure 12:
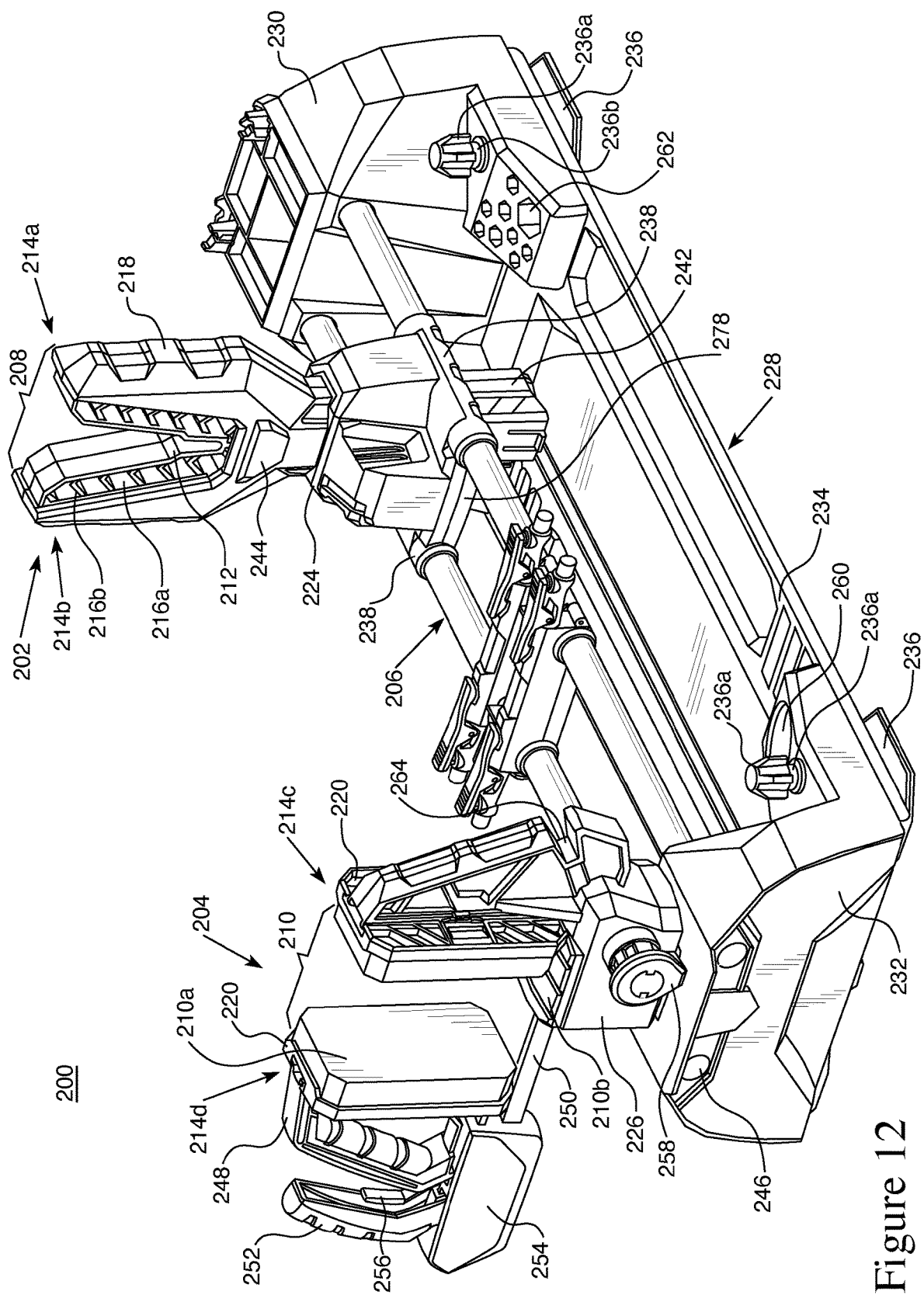
FIG. 12 is a perspective view of the adjustable support stand of FIG. 11.
Figure 13:
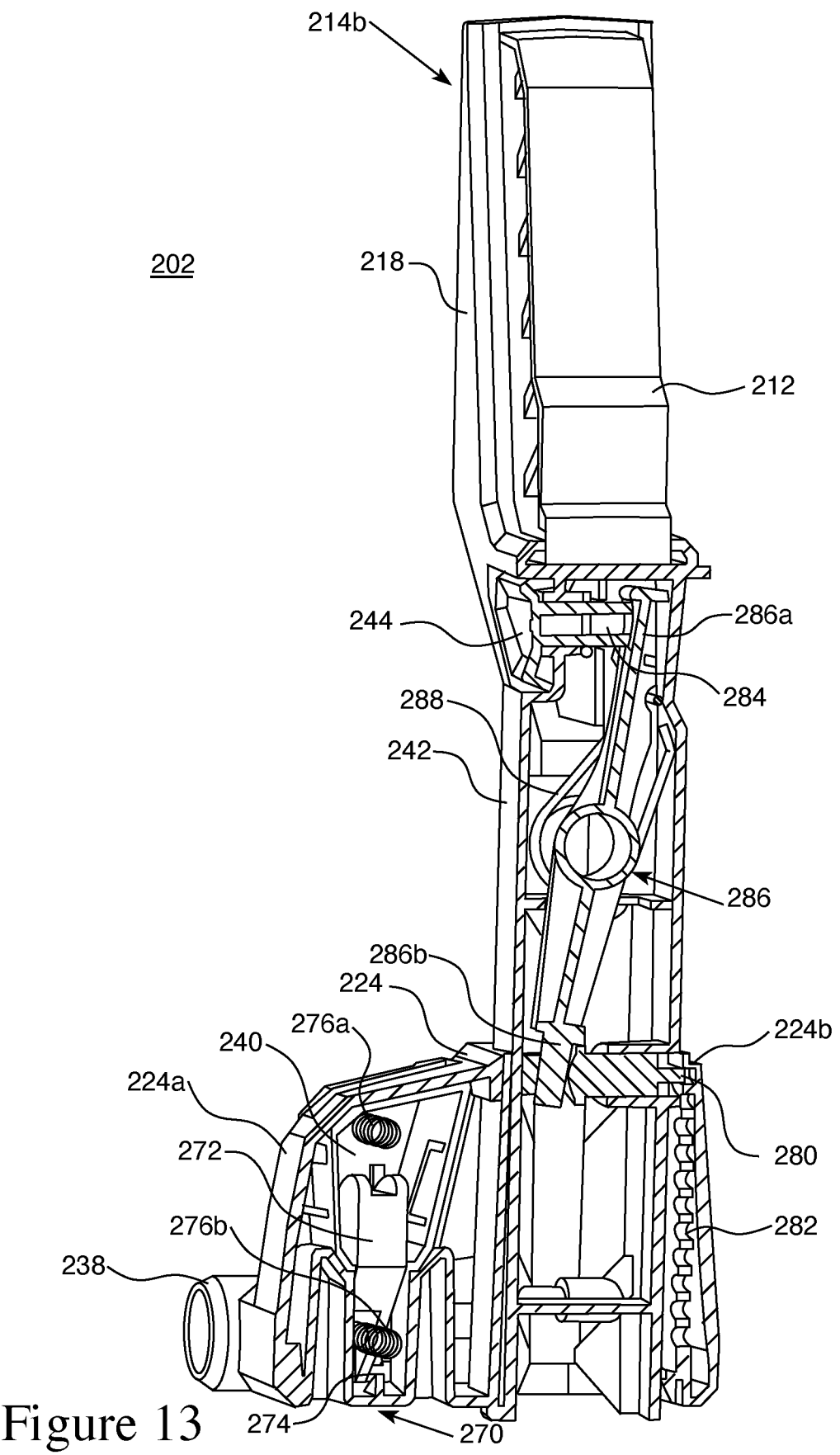
FIG. 13 is a cross-sectional view of a portion of the adjustable support stand of FIG. 11.
Figure 14:
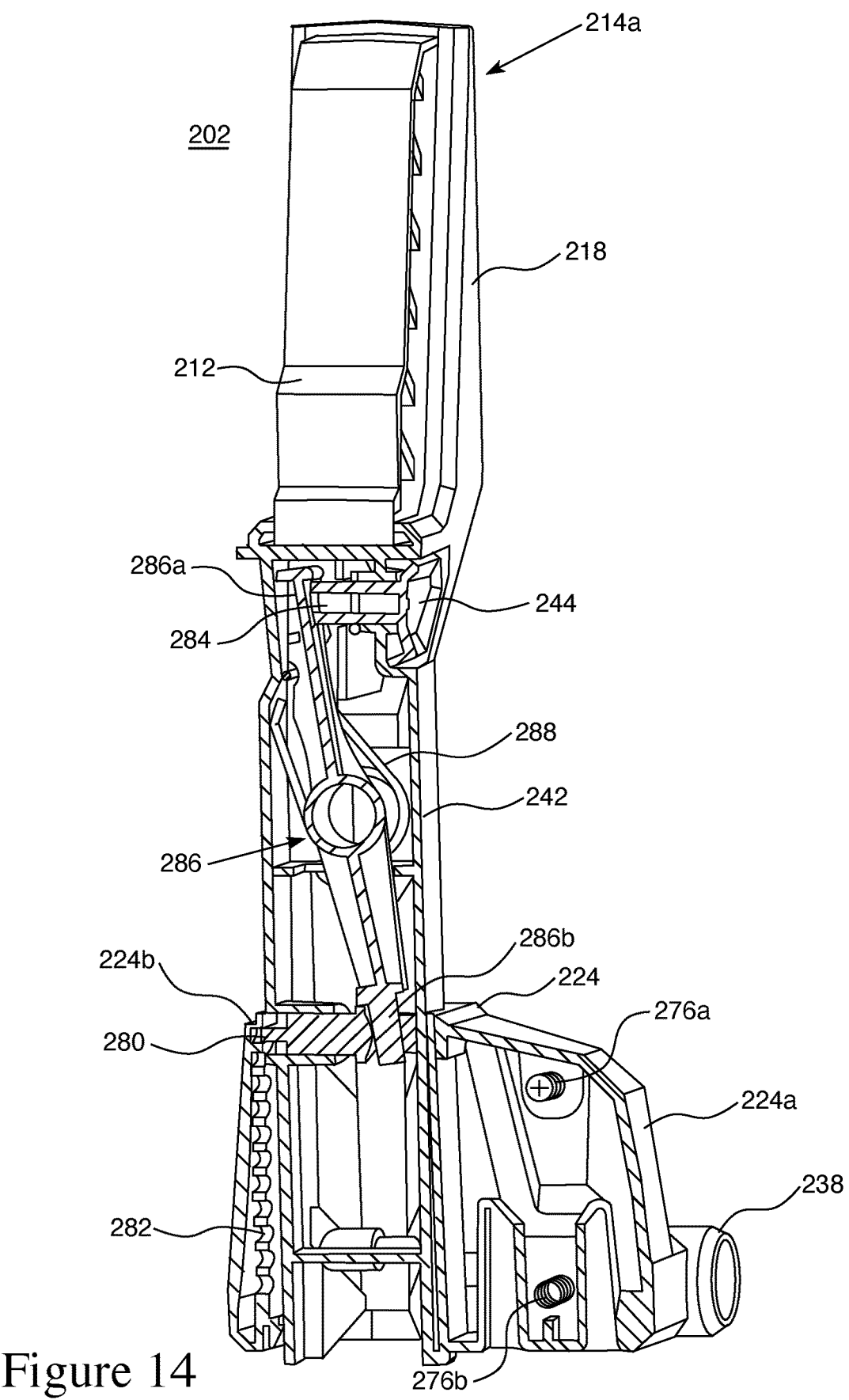
FIG. 14 is a cross-sectional view of a portion of the adjustable support stand of FIG. 11.
Figure 15:
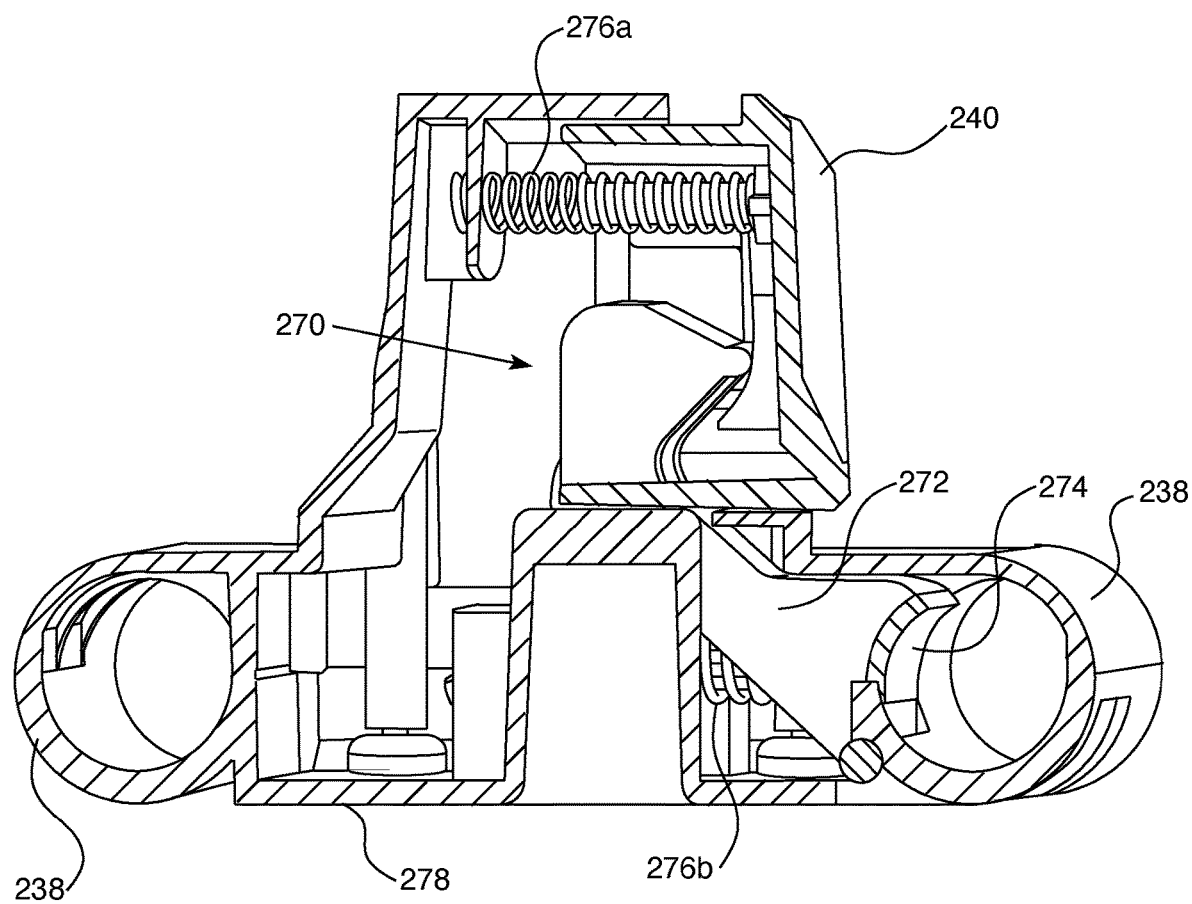
FIG. 15 is a cross-sectional view of a portion of the adjustable support stand of FIG. 11.
Figure 16:
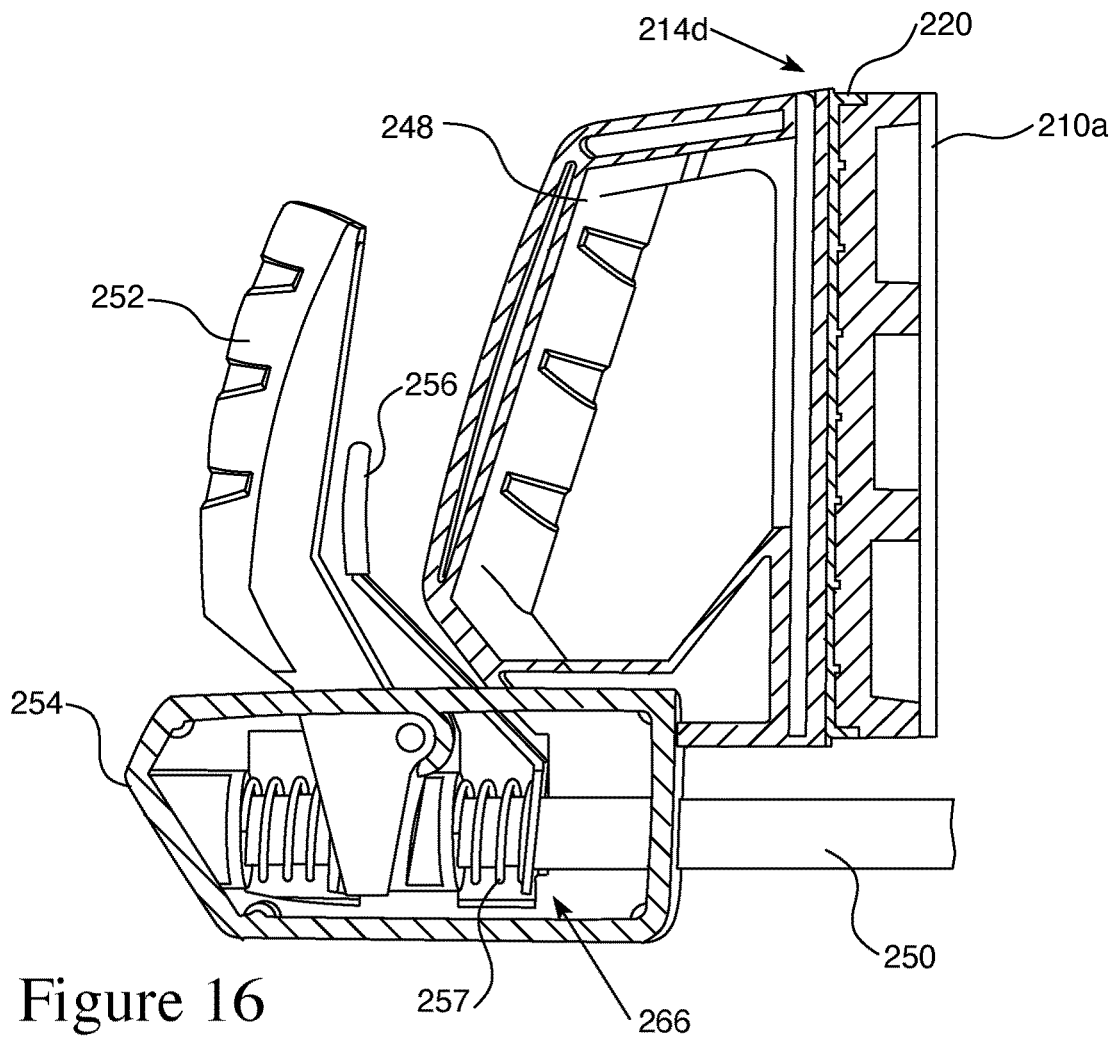
FIG. 16 is a cross-sectional view of a portion of the adjustable support stand of FIG. 11.
Figure 17:
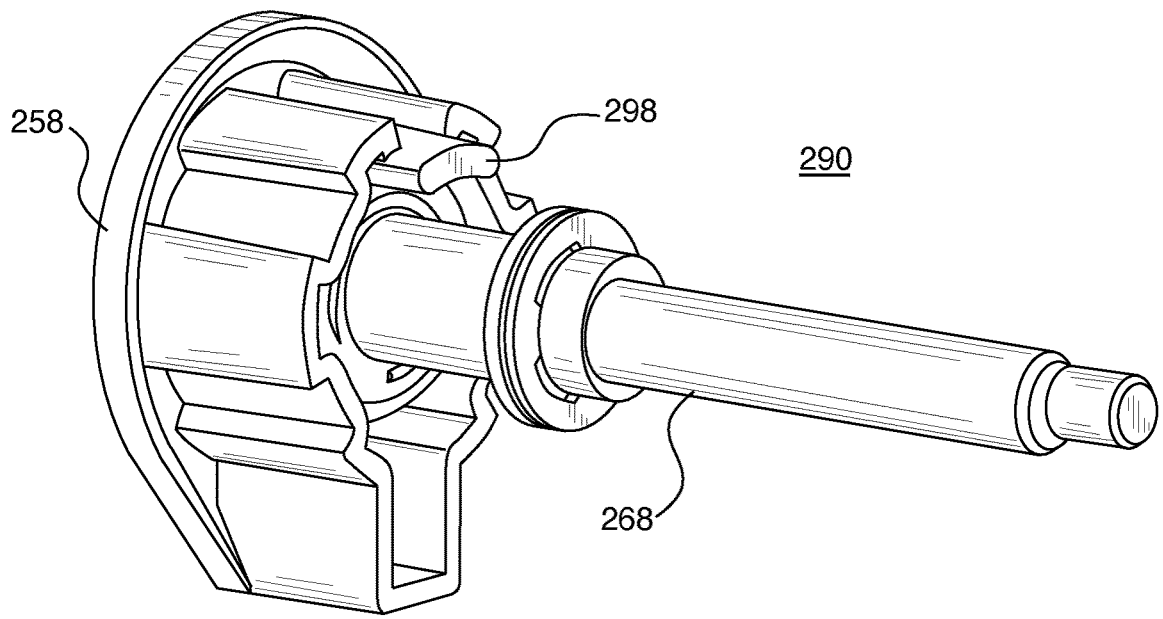
FIG. 17 is a perspective view of a knob of the adjustable support stand of FIG. 11.
Figure 18:
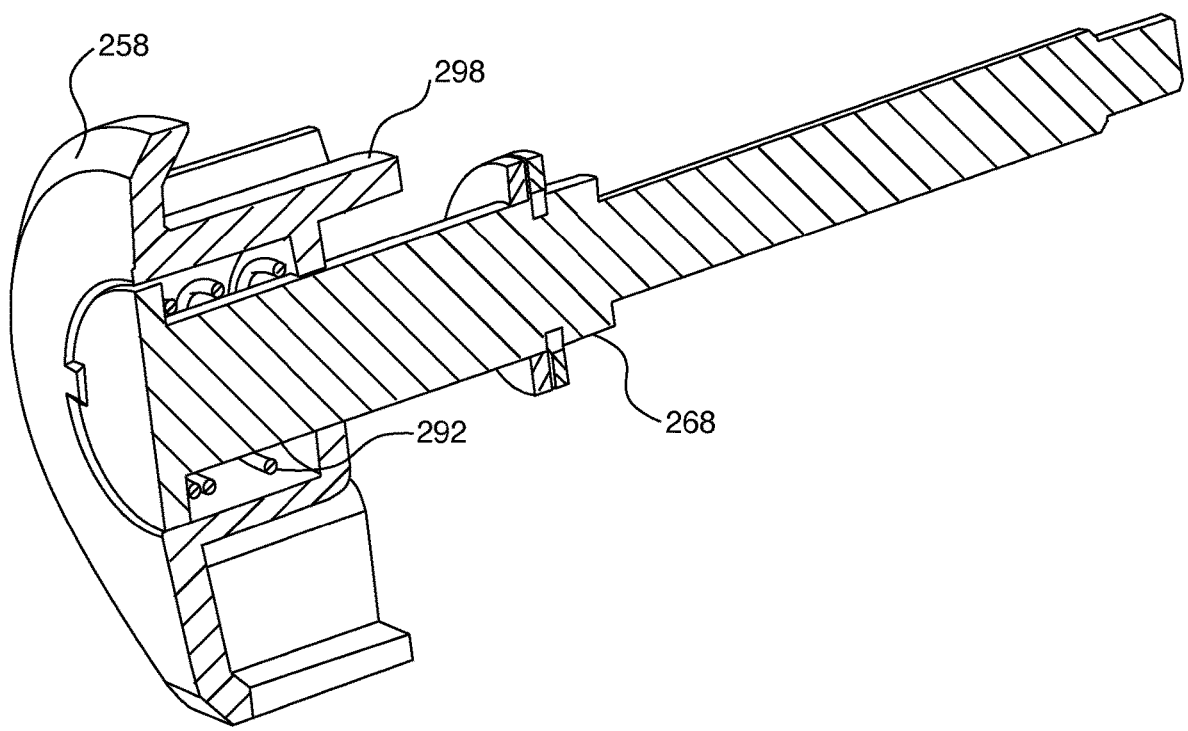
FIG. 18 is a cross-sectional view of the knob of FIG. 17.
Figure 19:
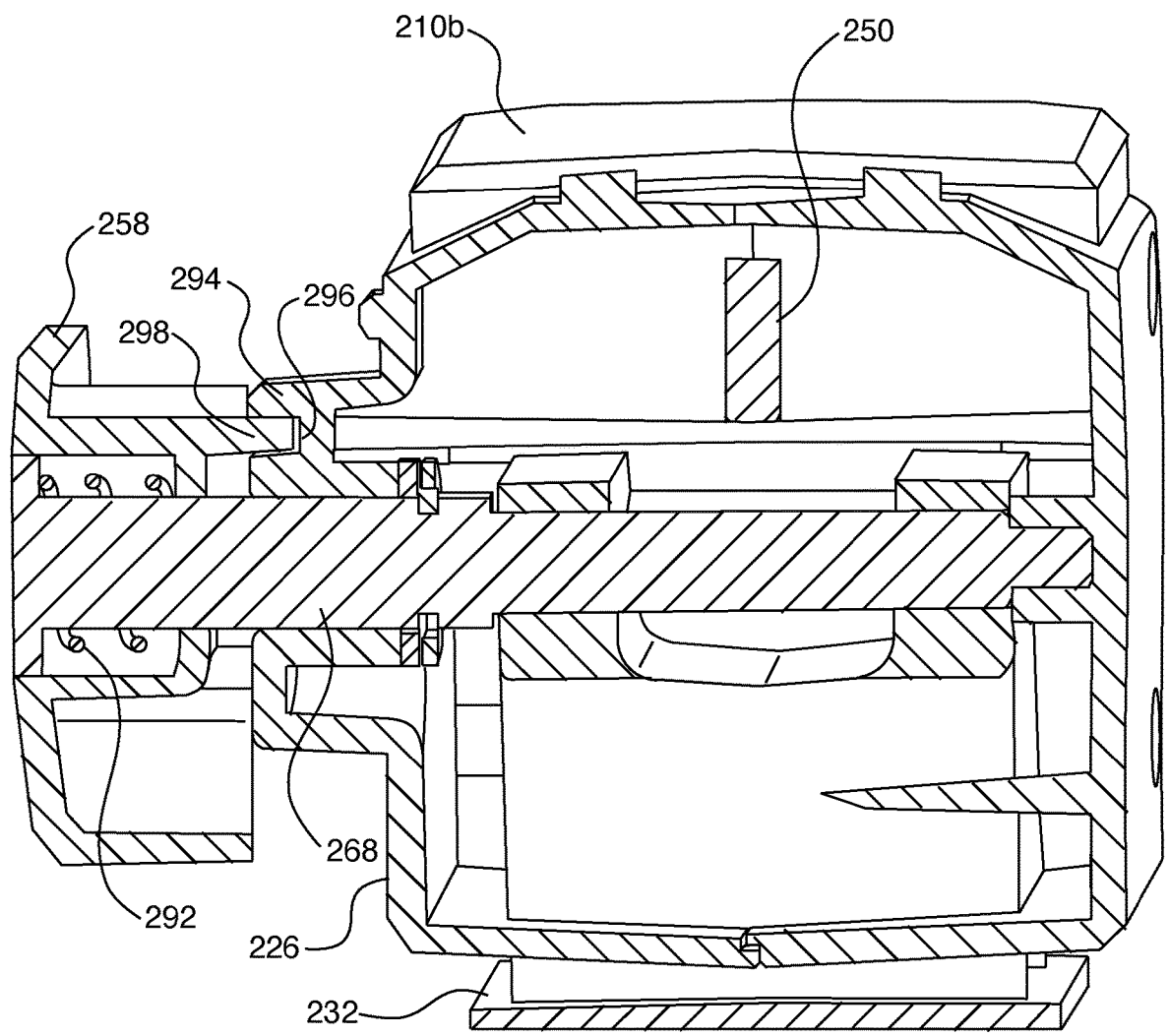
FIG. 19 is a cross-sectional view of a portion of the adjustable support stand of FIG. 11.
Figure 21:
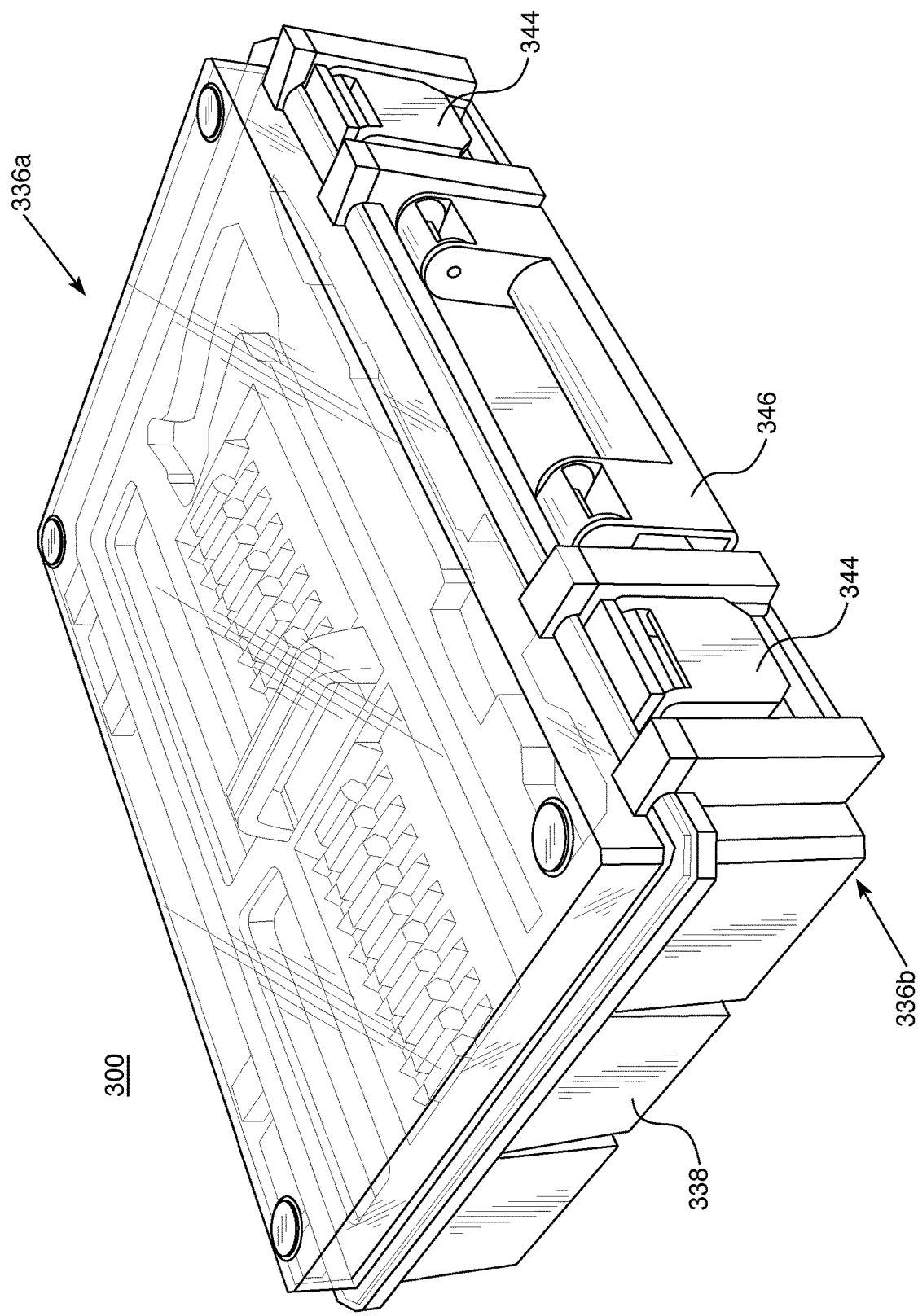
FIG. 21 is a perspective view of the third embodiment in a collapsed configuration.

Additional views of the adjustable support stand are provided. FIG. 2 is a perspective view of the adjustable support in a collapsed configuration. FIG. 3 is a perspective view of a firearm secured in the adjustable support. FIG. 4 is a perspective side view of the adjustable support. FIG. 5 is a top plan view of the adjustable support. FIG. 6 is a front elevational view of the adjustable support. FIG. 7 is a rear elevational view of the adjustable support. FIG. 8 is a bottom perspective view of the adjustable support. FIG. 9 is a cross-sectional view of the adjustable support. FIG. 10 is an exploded view of the adjustable support. FIG. 11 is a perspective view of a second embodiment of an adjustable support stand. FIG. 12 is a perspective view of the second adjustable support stand. FIG. 13 is a cross-sectional view of a portion of the second adjustable support stand. FIG. 14 is a cross-sectional view of a portion of the second adjustable support stand. FIG. 15 is a cross-sectional view of a portion of the second adjustable support stand. FIG. 16 is a cross-sectional view of a portion of the second adjustable support stand. FIG. 17 is a perspective view of a knob of the second adjustable support stand. FIG. 18 is a cross-sectional view of the knob of the second adjustable support stand. FIG. 19 is a cross-sectional view of a portion of the second adjustable support stand. FIG. 20 is a perspective view of a third embodiment of an adjustable support stand. FIG. 21 is a perspective view of the third embodiment in a collapsed configuration.

In some embodiments, the adjustable support stand can have a substantially rectangular footprint, wherein the first and second ends are approximately parallel to each other and equal in length, the first and second sides are approximately parallel to each other and equal in length, and the ends are at approximately perpendicular angles to the sides, as illustrated in FIG. 5. The embodiments in FIGS. 11 and 20 also illustrate a substantially rectangular footprint.

As mentioned above, one embodiment of adjustable support stand 100 may include front support 102, rear support 104, and telescoping rails 106. Front support 102 may be comprised of front grip 108, which can be part of vertical arms 114a and 114b and can include chevron voids 116a. Front grip 108 may be positioned in front housing 118, which may further include front base 124. Similarly, rear support 104 may be comprised of rear grip 110, which can be part of vertical arms 114c and 114d and can include chevron voids 116a. Rear grip 110 may be positioned in rear housing 120, which may further include rear base 126. Telescoping rails 106 may include locking mechanism 138, which can lock the telescoping rails in place and can lock front support 102 and rear support 104 in a collapsed position, as described further herein.

A second embodiment of adjustable support stand 200 may include front support 202, rear support 204, and rails 206. Front support 202 may be comprised of front grip 208, which can be part of vertical arms 214a and 214b and can include chevron voids 216a and chevron rungs 216b. Front grip 208 may be positioned in front housing 218, which may further include front base 224. Similarly, rear support 204 may be comprised of rear grip 210, which can be part of vertical arms 214c and 214d. Rear grip 210 may be connected to rear housing 220, which may further include rear base 226. Rails 206 may be positioned between front foundation end 230 and rear foundation end 232, on or near which front support 202 and rear support 204, respectively, can be located. Front base 224 may be positionable along rails 206 such that the distance between the front base and rear base 226 can be shortened or lengthened as needed. Additionally, front support 202 may be height adjustable.

A third embodiment of adjustable support stand 300 may include front support 302, rear support 304, and interior cavity 306. Front support 302 may be comprised of front grip 308, which can be part of vertical arms 314a and 314b and can include chevron voids 316a and chevron rungs 316b. Front grip 308 may be positioned in front housing 318, which may be positioned within a front cavity (not visible). Similarly, rear support 304 may be comprised of rear grip 310, which can be part of vertical arms 314c and 314d and can include chevron voids 316a and chevron rungs 316b. Rear grip 310 may be positioned in rear housing 320, which may be positioned within a rear base 326. Interior cavity 306 may be approximately rectangular and can be structured and configured to house front support 302 and rear support 304 when they are in a collapsed position, as described further herein.

Supports

As mentioned above, the adjustable support stand 100/200/300 can include a front support 102/202/302 on a first end of the adjustable support stand and a rear support 104/204/304 on an opposing, second end of the adjustable support stand. The front supports 102/202 and rear supports 104/204 can be connected by a rail or a pair of rails 106/206, as illustrated in FIGS. 1 and 11, which can be telescoping rails or static rails. Alternatively, the front support 302 and rear support 304 can be part of a bottom compartment 336b of a storage container/case and can be positioned on opposing ends of the storage container, as illustrated in FIG. 20.

Arms

As illustrated in FIGS. 1-3, 6-8, 10-12, and 20, the front and/or rear supports can have vertical arms 114a-d/214a-d/314a-d that create an approximate V-shape or U-shape. The opening between each set of arms 114a-d/214a-d/314a-d on the front supports 102/202/302 and rear supports 104/204/304 can be where an object to be worked upon is placed, as illustrated in FIGS. 3 and 20. One object that can be supported by the adjustable support stand 100/200/300 can be a firearm. Commonly, the barrel and the stock are the desired components of the firearm to be put in contact with a support. Since the barrel of the firearm is narrower than the stock, the front supports 102/202/302 and rear supports 104/204/304 may have openings between the two arms that are of different widths. In one embodiment, the front support 102/202 may be narrower than the rear support 104/204, as illustrated in FIGS. 6-7 and 11-12. Additionally, either of the front or rear supports may be stepped such that a transition point between the top portion of the opening and the bottom portion of the opening may include a step 112/212/312, as illustrated in FIGS. 1, 11 and 20.

Step

The step 112/212/312 can provide a resting point for the stock prior to the meeting point of the vertical arms 114a-d/214a-d/314a-d at their base. Therefore, the stock can be supported on the step 112 and above the transition point, which can be a higher location than where the two arms in the rear support 114c-d join together, as illustrated in FIG. 3. This configuration enables the firearm to be oriented in the support with the stock in a higher vertical position compared to the barrel. Therefore, any solutions being used to clean the barrel that are applied to a proximal end of the barrel (i.e., an end of the barrel closer to the action and stock) may more easily drain toward the distal end of the barrel (i.e., the end of the barrel further from the action and stock). Alternatively, the forestock may be supported on the step 312 and above the transition point, as illustrated in FIG. 20.

As noted above, the object being worked upon, such as a firearm, can be placed in the front supports 102/202/302 and rear supports 104/204/304 in either of two configurations (i.e., the front of the object in the front support and the rear of the object in the rear support or, alternatively, the rear of the object in the front support and the front of the object in the rear support), and either the rear support 104 or the front support 202/302 can be stepped. Therefore, in one embodiment, the stock (i.e., the broader portion of the object) can be supported by the rear support 104 if it is stepped, as illustrated in FIG. 3. In another embodiment, the barrel or forestock (i.e., the narrower portion of the object) can be supported by the front support 302 if it's stepped, as illustrated in FIG. 20. In some embodiments, the rear support may be stepped, but may still support the narrower portion of the object, such as the barrel or forestock. Ultimately, either, or both, of the front and rear supports can be stepped and the placement of the object to be worked upon is not limited; it can be placed with either end in either support.

In some embodiments, the front support 202 may be configured to include the step 212 and a rear support 204 may be U-shaped instead of V-shaped, as illustrated in FIGS. 11-12. In such an embodiment, the step 212 in the front support 202 may allow the support to be compatible with both a stock, a forestock, and a barrel. Therefore, the front support 202 can include the stepped configuration to allow the barrel to be secured below the transition point of the support or to allow the forestock to be supported above the transition point. In cases where the rear support 204 is U-shaped, the rear support may be a vise wherein the rear arms 214c-d can be vise jaws, the rear grip 210 can be a set of vise jaw pads that clamp onto the sides of the stock to hold it in place, and the rear housing 220 can be a rigid structure onto which the rear grip (i.e., the set of vise jaw pads) is placed. The rear support 204 (i.e., the vise) can also have a base 226 to support the bottom of a stock. As illustrated in FIGS. 11-12, the rear support 204 may be a vise.

Grip

Further, the front and rear supports can both have a grip for securing in place an object to be worked upon. In some embodiments, the grips of the front and rear supports are made from the same material. In other embodiments, the grips are made from different materials. In some embodiments, at least one of the grips are deformable and made from a non-slip material providing a high friction coefficient such as, but not limited to, thermoplastic rubber, thermoset rubber, other polymers, natural or synthetic rubbers, plastics, or similar material. A rubber material can exhibit useful properties for securing an object in place, including tackiness or high-friction between the object and the grip.

In some examples, the grip can be provided in multiple, non-connected pieces. Such multiple pieces of the grip material may be referred to in the context of the present disclosure in the singular as "a grip." One example of such a grip is shown in FIG. 11, wherein the rear grip 210 is comprised of a set of separate vise jaw pads 210a and, optionally, a base pad 210b. In other examples, such as that of front grips 108/308 and rear grips 110/310 in FIGS. 1-10 and 20 as well as front grip 208 in FIGS. 11-12, the grip can include grip material that is substantially connected or contiguous. In some examples, a grip can consist essentially of grip material that is contiguous.

Chevrons

As illustrated in FIGS. 6-7, 11-12, and 20, the front support 102/202/302 and/or rear support 104/204/304 can further include chevron voids 116a/216a/316a. More specifically, the grips of the front and/or rear supports can be comprised of a grip material (ex: thermoplastic or thermoset rubber) that outlines a series of vertically stacked chevron voids defined by chevron rungs. More specifically, the grip material can frame the top, bottom, and sides of the front grip 108/208/308 and/or rear grip 110/210/310 and further fill in the frame with spaced apart, stacked chevron rungs 116b/216b/316b, thereby leaving chevron voids 116a/216a/316a in between the rungs. As is commonly understood, the term "chevron" refers to an object or space having an inverted V-shape. In the current disclosure, this definition continues to apply.

While the chevron runs are described as being vertically stacked, vertical does not require an exact North/South or up/down configuration. Rather, when the support is in an upright configuration, the chevrons are at least above a 45-degree angle. Further, the chevron rungs and voids of the present disclosure can be symmetrical or, as illustrated in FIGS. 6 and 7, they may be a-symmetrical such that one side of a chevron void 116a may be slightly longer than the other, or the height along the length of each chevron void 116a or chevron rung 116b may vary. For example, the outer portion of the chevron void and rung 116a-b may be shorter than the central portion, as illustrated in FIG. 6. Alternatively, the central portion of the chevron void and rung 116a-b may be shorter than the outer portion, as illustrated in FIG. 7. Further, the height of the chevron rungs 116b may be shorter than the height of the adjacent chevron voids 116a, as illustrated, however this is not required. In some embodiments, the chevron rungs 116b may have the same height as the chevron voids 116a/216a/316a or be taller.

As illustrated in FIGS. 6-7, 11-12, and 20, the front grips 108/208/308 and/or rear grips 110/210/310 may primarily be comprised of the chevron voids 116a/216a/316a and rungs 116b/216b/316b but may have non-chevron portions at the top and bottom of the grips to accommodate the remaining space between the topmost and bottommost chevron rungs and the grip's frame. Additionally, the chevron voids 116a/216a/316a and rungs 116b/216b/316b may comprise the full width of the front grips 108/208/308 and/or rear grips 110/210/310 such that there are no other shapes or materials to the right or left of the chevrons other than the frame of the grips. More specifically, the front grips 108/208/308 and/or rear grips 110/210/310 may each be comprised of two arms, as described herein, and each of those arms can have a single column of chevron voids 116a/216a/316a and rungs 116b/216b/316b. Therefore, each grip 108/208/308 and/or 110/210/310 may have two columns of chevron voids 116a/216a/316a and rungs 116b/216b/316b, but those columns can be separated by a V- or U-shaped gap such that there are no other shapes or materials to the right or left of the chevrons other than the frame of the grips.

As mentioned above, the grip may be deformable. Therefore, if the grip is comprised of chevron voids and rungs, the chevrons are also deformable. When an object to be worked upon is placed in the grip and is larger than the void between the two arms, the grip and, correspondingly, the chevrons will deform. The chevron voids can become smaller and the grip can collapse on itself. Additionally, the chevron rungs in each vertical stack may come into closer proximity to each other while the chevron rungs on an opposite arm may get further apart. This functions to provide a compressed and secured grip on the object being worked upon. In some embodiments, if an object has a fairly small radius, the chevron rungs and voids near the top of the support may not be deformed even though the rungs and voids further down on the support are deformed.

Housings

In addition to the vertical arms and the front and rear grips, the front and rear supports can be further comprised of housings, which are structured and configured to house the grips. Therefore, the front support 102/202/302 can be comprised of two arms 114a-b/214a-b/314a-b, which have a front grip 108/208/308 that is secured in or on a front housing 118/218/318. Additionally, the rear supports 104/204/304 can be comprised of two arms 114c-d/214c-d/314c-d, which each have a rear grip 110/210/310 that is secured in or on a rear housing 120/220/320. The housing may be contiguous between the two arms of each support and secured to a base at its bottom, as shown in the front supports 102/202/302 of all three embodiments herein and the rear supports 104/304 of the embodiments in FIGS. 1 and 12, or each arm may have a separate, non-contiguous housing that is separately secured to a base, as illustrated by the rear support 204 in FIG. 11. The grips may also be contiguous between the two arms of each support, as shown in the front supports 102/202/302 of all three embodiments herein, or each arm may have a separate, non-contiguous grip, as illustrated by the rear support 204 in FIG. 11.

In some embodiments, the front housing 118/318 and rear housing 120/320 can be configured such that they have an approximately rectangular outline, as illustrated in FIGS. 6-7 and 20. As mentioned above, the housings 118/318 and 120/320 can have a V-shaped opening in the upper, majority portion, wherein the opening is through the front and rear faces of the housing. Additionally, the housings 118/318 and 120/320 can have a lower, minority portion that is primarily void of openings and that connects to the base 124/(not visible) and 126/326. In some embodiments, the lower portion of the housings 118/318 and 120/320 can each include a pin 128/(not visible) on each side of the housing that enables the housings to adjustably connect to the bases 124/(not visible) and 126/326. More specifically, the pins 128/(not visible) can be located on each side of the housings 118/318 and 120/320 near the bottom portion and can protrude outward. The bases 124/(not visible) and 126/326 can include corresponding vertical tracks 130/330 for the pins 128/(not visible) that are on interior portions of the bases. In some cases, the vertical tracks 130 can be located between the top of the adjustable feet 136 and just beneath the connection of the rails 106 to the base 124, as illustrated in FIG. 9. In other cases, the vertical tracks 330 can be located on the dividers 340 near the case sides 338, as illustrated in FIG. 20. This connection enables the housings 118/318 and 120/320 to fold over and collapse relative to the bases 124/(not visible) and 126/326 for easy storage and transportation of the adjustable support stand 100/300.

In some embodiments, the housing 218 can be configured such that it is approximately Y-shaped, wherein it has an upper, branched portion and a lower, straight, shaft portion 242, as illustrated in FIGS. 11-12. The grip 208 can be secured in the upper, branched portion of the housing 218, and the shaft 242 of the housing can be slidable through the base 224 in order to adjust the height of the housing. For example, sliding the shaft 242 of the housing 218 down through the base 224 can cause the housing to have a smaller height then before (i.e., it is shorter), whereas sliding the shaft of the housing up through the base can cause the housing to a have a greater height than before (i.e., it is taller). The means by which this height adjustment mechanism takes place is described in more detail below.

Instead of being rectangular or Y-shaped, the housing may, as mentioned above, be comprised of non-contiguous portions that are each separately secured to the base. More specifically, as illustrated in FIGS. 11-12 and 16, the support 204 may be comprised of two parallel housing portions 220 that each have a grip 210a and connect, directly or indirectly, to the base 226 and further include a clamping mechanism 266 such that the housing, base, and grip are, collectively, a vise. Therefore, the rear support 204 can be a vise, the rear arms 214c-d can be vise jaws, the rear grip 210 can be vise jaw pads, and the rear housing 220 can be the rigid parallel portions of the arms that can attach to the rear grip (i.e., the vise jaw pads). The housing 220 can directly or indirectly attach to a handle 248, a lever 252 and spring-based clamping mechanism 266.

As mentioned above, the rear housing 220 can be comprised of two parallel housing portions that each have a relatively flat inner face orientated to face the inner face of the opposing portion of the rear housing. The inner faces can be approximately rectangular with a height being longer than a width. The rear grip 210 can attach to these relatively flat inner faces. At least one of the housing portions may also include a handle 248 on a side opposite the inner face, as illustrated in FIG. 11. The handle 248 can be positioned perpendicular to the outer face of the housing such that it protrudes out at a right angle from the outer face. The handle 248 can be used to push or pull the respective housing portion toward and away from the opposing housing portion, thereby increasing or decreasing the overall width of the rear housing 220.

To enable the housing portions of the rear housing 220 to remain connected while the width between them changes, the housing portions can each be connected to a bar 250. One housing portion may be positionally fixed on the bar 250 while the other may either slide along the bar or, alternatively, allow the bar to slide through it. Therefore, while one housing portion may be positionally fixed on the bar 250, the other housing portion may be positionally fixed on the adjustable support stand 200 (for example, it can be fixedly mounted to the top or the side of the base 226) and may allow the bar to slide through it such that the first housing portion can move relative to the other housing portion and relative to the adjustable support stand. In embodiments with a base 226 between the housing portions 220, the bar 250 may also slidably penetrate through the body of the base.

Therefore, as illustrated in FIG. 11, one embodiment of the adjustable support stand may have a rear support 204 comprised of rear arms 214c-d with a rear base 226 located between the rear arms and a bar 250 connecting the rear arms to each other and to the base. The rear arms 214c-d can be comprised of a rear housing 220 having two parallel housing portions, a rear grip 210 having multiple, non-connected pieces that are each connected to an inner face of a housing portion, and a handle 248 positioned perpendicularly to the outer face of one of the housing portions. The bar 250 can be slidingly connected to the first arm 214*d* having the handle 248, can be fixedly connected to the rear base 226 and can be fixedly connected to the second arm 214*c*. To fix the positioning of the first arm 214*d* relative to the second arm 214*c*, a spring-based clamping mechanism 266 can be incorporated with the bar 250 near the bottom of the first arm 214*d*. The clamping mechanism 266 can be comprised of a lever 252 and a spring 257 housed inside a car 254 that operates to lock the position of the first arm 214*d* in place. The clamping mechanism 266 is described in more detail below.

While specific combinations of housings have been described above, any combination of the above housings may exist for the adjustable support stand. For example, in some embodiments, the adjustable support stand can have one support that is comprised of a Y-shaped housing with a grip and one support that is a vise, as illustrated in FIGS. 11-12. In other embodiments, the adjustable support stand may have one support that is comprised of a Y-shaped housing with a grip and one support that is comprised of a V-shaped housing with a grip (for example, if the vise of the embodiments in FIGS. 11-12 was replaced with a V-shaped housing with a grip). In yet other embodiments, the adjustable support stand may have one support that is comprised of a V-shaped housing with a grip and one support that is a vise (for example, if the vise of the embodiments in FIGS. 11-12 was paired with a V-shaped housing with a grip). In some embodiments, the adjustable support stand may have two supports that are the same. For example: both supports can be comprised of V-shaped housings with grips, as illustrated in FIGS. 1 and 12, both supports can be comprised of Y-shaped housings with grip, or both supports can be comprised of supports that are vises.

Grip Tabs/Attachment of Grip to Housing

As illustrated in FIG. 1, the front housing 118 and rear housing 120 may retain the respective front grip 108 and rear grip 110 in a secured configuration through the presence of tabs 122. This configuration may also be present in the embodiments illustrated in FIG. 11 (the front grip 208 can be retained in the front housing 218 through tabs 222) and FIG. 20 (the front grip 308 and rear grip 310 can be retained in the respective front housing 318 and rear housing 320 through tabs 322). Therefore, the housing can provide support to the grip due to the deformable and flexible nature of the grip. More specifically, the outer frame of the grip can be retained and secured within the housing. Further, the frame may be secured thereto by tabs on the housing that are positioned between the chevron voids, as illustrated in FIGS. 1, 11, and 20. There may be tabs in each chevron void such that there are an equal number of tabs as there are chevron voids, or there may be fewer or more tabs than there are chevron voids. For example, in the embodiment illustrated in FIG. 1, there are five chevron voids on each arm and five corresponding tabs on each side (ex: front, back) of each arm. However, even if there are five (or more) chevron voids on each arm, there may be a non-equal number of tabs on each side of each arm. There may be fewer tabs, in which case some chevron voids will not have a tab, or there may be more tabs, in which case the non-chevron voids near the top or bottom of the grips may have tabs.

Instead of tabs, the grip 210 may otherwise be attached to the housing 220, as illustrated in FIG. 11. As briefly mentioned above, the rear grip 210 can be comprised of multiple, non-connected pieces that separately attach to non-contiguous portions of the housing 220. The attachment can occur through permanent means or through non-permanent means that allow the grip to be replaced. For example, adhesives, screws, bolts, rivets, and mechanical attachment means such as tongue-in-groove, dovetail connections, and t-slots. The grip may have a portion that slides over the housing or around the edges of the housing to effectively "grip" onto the housing. As illustrated in FIGS. 11-12, the grip may be two relatively rectangular pieces. Further, the grip may be smooth on all sides or, alternatively, the grip may have texture to assist with gripping object to be worked upon. The relative size and shape of the grip can match the inner face of the housing portions or can be slightly smaller or slightly larger.

Base

In some embodiments, the front and rear supports can have a base to which the front and rear housings connect. The base may be directly connected to, or be a continuation of, the housing, and the base can take many forms, as shown in FIGS. 1, 11, and 20. For example, the front and rear bases can be end portions of the adjustable support stand to which the housings attach, as illustrated in FIG. 8. Alternatively, the base can mount directly to the rails and, optionally, the housing can slidably attach to the base, as illustrated in FIG. 11. In another example, the base can be positioned between two separate portions of the housing and can directly support the object to be worked upon, as illustrated in FIG. 11. In yet another example, the base can be part of a larger storage container and can include a cavity into which the housings can be inserted, as illustrated in FIG. 20.

In some embodiments, the attachment between the housing and the base may accommodate various adjustment mechanisms. For example, the attachment mechanism may be adjustable such that the housing can be folded over with respect to the base, as illustrated by the front support 102 and rear support 104 in FIG. 2. The embodiment in FIG. 20 is also configured to have housings that are foldable relative to the base. In another example, the housing can be height-adjustable, as illustrated by the front support 202 in the embodiment of FIG. 11. In yet another example, the housing can be width-adjustable, as illustrated by the rear support 204 in the embodiment of FIG. 11. These various adjustments enable the adjustable support stand to collapse, to accommodate various-sized objects, and to be easily transportable.

As illustrated in FIG. 1, the front base 124 and rear base 126 may be end portions of the adjustable support stand 100 in that they demarcate the outer bounds of the support stand. The bases 124/126 may provide mounting surfaces for the rails 106, the front and rear housings 118/120, and the adjustable feet 136. More specifically, the bases 124/126 can be configured such that the housings 118/120 can nestle into a space defined by an interior-facing wall and a pair of legs. The housings 118/120 can lock to the bases 124/126 by virtue of a locking mechanism that is described in more detail below. The feet 136 can attach to the bottom of each leg of each base 124/126, as illustrated in FIG. 8, and the rails 106 can attach to the top of each leg of each base, as illustrated in FIG. 10. When the adjustable support stand 100 is completely collapsed, the bases 124/126 dictate the overall height and width of the support stand while the rails dictate the length.

While some embodiments of the adjustable support stand have the bases as the end portions, other embodiments have a separate foundation 228 to which the bases are directly or indirectly attached or mounted. For example, as illustrated in FIG. 11, the front base 224 can attach to, and be slidable along, the rails 206, which can then mount to a front foundation end 230. Therefore, instead of the rails mounting to the base, as described above, the front base 224 can mount to the rails 206, and the front ends of the rails can mount to a front foundation end 230. The front base 224 can, as described further herein, include rail connectors 238 and a rail locking mechanism. The rear ends of the rails 206 can then mount to a rear foundation end 232. Further, in some embodiments, the rails 206 may be hollow and the rear ends of the rails may penetrate completely through the rear foundation end 232 such that an open rail end 246 is accessible to a user, as illustrated in FIG. 11, for storage purposes. Therefore, if a user is cleaning the barrel of their firearm with a cleaning rod, the user can quickly and easily store the cleaning rod by inserting it into one of the open rail ends 246.

In another example, as illustrated in FIG. 11, the base, such as the rear base 226, can attach directly to a rear foundation end 232 and can provide a surface (in some cases, a padded surface 210b) upon which an object to be worked upon can be placed. For example, a bottom portion of the rear base 226 can attach to a top portion of the rear foundation end 232. This connection can, in some cases, enable a scope-leveling mechanism 290 to make small adjustments in the position of the rear base 226 relative to the rear foundation end 232 and, therefore, make small adjustments to the angle and/or position of the object being worked upon. In addition to having a scope leveling mechanism 290, the rear base 226 can also allow a horizontal bar 250 to be slidably connected through it to allow the rear housing 220 to have an adjustable width, as described in more detail above.

In another example, the base can be part of a larger storage container and can define a cavity into which the housings can be inserted. For example, as illustrated in FIG. 20, the adjustable support stand 300 can be a case comprised of a top compartment 336a and a bottom compartment 336b. The configuration of the stand as a case can enable a user to easily transport and/or store all of the materials he or she would need to work on an object that requires supports. In this example, the front base (not visible) and rear base 326 can be spaces or cavities that are comprised of the components of the case onto which the housings 318/320 can be mounted. More specifically, the bases can be comprised of the case sides 338 and the dividers 340, which work together to define a cavity into which the housings 318/320 can be stably positioned. The bottom compartment 336b of the case can have at least two dividers 340 that create three sections: an interior cavity 306 between the two housings 318/320 and side cavities 350 on either side of the two housings for storage of additional cleaning or maintenance materials, as illustrated in FIG. 20. The housings 318/320 can have pins (similar to pins 128) on their sides that pair with vertical tracks 330 in the at least two dividers 340. Additionally, the internal faces of the case sides 338 can have vertical hooks (similar to 132) that slide into vertical slots (similar to 134) of the housings 318/320. The mounting/storing mechanism for the housings 318/320 is described in further detail below. Additionally, the interior cavity 306, defined by the at least two dividers 340, can be sized and configured to store the housings 318/320 when they are horizontally folded over, as described below. Since the housings 318/320 are stored in the interior cavity 306, the side cavities 350, which are also defined by the at least two dividers 340, can be available to store other tools, accessories, implements, and cleaners, as illustrated in FIG. 20.

To accommodate even more tools, accessories, and implements, the top compartment 336a can be configured to have friction fit storage cavities 342 for items so that when the top compartment is placed over the bottom compartment 336b, the tools stored in the top compartment do not fall out. In another embodiment, the top compartment 336a can be completely open storage into which a storage mat 348 can be placed so that instead of the mat having to retain tools when the top compartment is upside down, the mat can be removed from the top compartment and placed on top of the bottom compartment 336b before the top compartment is then latched to the bottom compartment. The top and bottom compartments 336a/b can be held together with a plurality of latches 344 and one of the top or bottom compartments 336a/b can further include a handle 346 for carrying purposes. The latches can be, for example, draw latches with flanking pivot hinges that enable the top compartment to both completely separate from the bottom compartment and act as a pivot depending on how many latches are opened. For example, from a locked configuration, if two draw latches on the same side are unlatched, the lid can pivot open along the opposite side latches to approximately 95 degrees (+/−15 degrees), whereas if all four draw latches are unlatched, the top compartment 336a in its entirety can be removed from the bottom compartment 336b.

Folding Mechanism

In embodiments where the adjustable support stand is foldable or otherwise collapsible, such as those in FIGS. 1 and 20, each housing 118/318 and 120/320 may include a pin 128/(not visible) that fits into a vertical track 130/330 on the bases 124/(not visible) and 126/326. The pins 128/(not visible) can be located on each side of the housings 118/318 and 120/320 near the bottom portion and can protrude outward. The vertical tracks 130/330 can be on interior portions of the bases 124/(not visible) and 126/326. Additionally, as illustrated in FIG. 10, the housings 118/120 may include vertical slots 134 on an outer face of the housings that accept vertical hooks 132 on an interior-facing wall of the bases 124/126. These connection points enable the housings 118/120 to stay connected to the bases 124/126 in the folded configuration through the pins/vertical tracks and, in the upright configuration, to stay both connected and secure through the vertical hooks/vertical slots.

In use, the housing can transition from the folded configuration, illustrated in FIG. 2, to the upright and locked configuration, illustrated in FIGS. 1 and 20, by (1) lifting the housing upward such that the pin moves from the bottom of the vertical track to the top of the vertical track, (2) aligning the housing upright and against the base, and (3) sliding the housing downward such that the vertical hooks on the interior face of the base hook into the vertical slots on the outer face of the housing and the pin slides back down the vertical track. To transition the housing from the upright configuration, illustrated in FIGS. 1 and 20, to the folded configuration, illustrated in FIG. 2, the steps can be completed in reverse. The housing can be transitioned upward to slide the vertical hooks out of the vertical slots, then folded over and away from the base, and then moved downward until it is resting in a final resting configuration. When both the front and rear housings are folded over, they may overlap such that one may rest on the other, as illustrated in FIG. 2. In this configuration, one of the housings may not have a pin that is at the very bottom of the vertical track. Instead, it may be near a mid-point or even at the top of the vertical track.

However, the connection between the pin and the vertical track prevents either housing from being fully removed while in a folded or upright configuration. In embodiments where the adjustable support stand has a housing that is height-adjustable, the housing may include a lock and pin mechanism that enables it to be height-adjustable relative to the base. This is described in more detail below.

Feet

On the bottom of the adjustable support stand 100/200 there may be adjustable feet 136/236. In some embodiments, the bases 124/126 may be configured to house adjustable feet 136, as illustrated in FIG. 8. For example, each corner of the adjustable support stand 100 can have an adjustable foot 136 such that there are two feet on each base 124/126. In other embodiments, the adjustable support stand 200 may have intermediary components, such as a foundation 228 that supports the front and rear supports 202/204, that the feet 236 attach to, as illustrated in FIGS. 11-12.

In some embodiments, the feet of the adjustable support stand can attach and adjust through the use of a threaded connection point. For example, each foot 136 may have a cap 136a, a threaded rod (not visible) that connects the foot to the support stand 100, and a pad 136b on the underside of each cap, as illustrated in FIG. 8. The threaded rod can have a threaded connection with the support stand 100 to enable the foot 136 to move closer to or further from the support stand. Therefore, rotating the cap 136a clockwise and counterclockwise can move each corner of the support stand 100 up and down to balance the stand if it is on an uneven surface, to lift the stand into a higher overall position, or to otherwise adjust the leveling of the support stand. The pad 136b on the underside of the cap 136a can be a non-slip material, such as the non-slip material described in detail above, to prevent the support stand 100 from sliding when pressure is applied to the stand in use. The material of the pad 136b may be a similar material to the grip 108/110 or a different non-slip material.

In another example, each adjustable foot 236 may have a knob 236a, a shaft 236b, and a threaded rod (not visible) that enables the foot to be adjustable relative to the support stand 200, as illustrated in FIG. 11. More specifically, the front foundation end 230 and rear foundation end 232 may have extensions onto the foundation tray 234, the adjustable foot 236 may be located underneath those extensions, and the shaft 236b may penetrate through those extensions such that it connects to the knob 236a on top of the extensions. Similar to the first example, the threaded rod can have a threaded connection with the support stand 200 to enable the foot 236 to move closer to or further from the support stand. Therefore, rotating the knob 236a clockwise and counterclockwise can move each corner of the support stand 200 up and down to balance the stand if it is on an uneven surface, to lift the stand into a higher overall position, or to otherwise adjust the leveling of the support stand.

Telescoping Rails

As mentioned above, some embodiments of the adjustable support stand can include a rail. The rail can be a telescoping rail 106, as illustrated in FIG. 1, or a static rail 206, as illustrated in FIG. 11. The telescoping rail 106 can include a locking mechanism 138 in order to lock the outer rail 140 and inner rail 142 into a set length. This adjustability enables users to use the same support stand 100 for objects having a wide range of lengths. In some cases, a first rail can be partially or completely slidable into another rail, thereby nearly halving the length of the device. Additionally, while the telescoping rail is only illustrated with two pieces, it may be comprised of more than two pieces to provide more flexibility for users and a wider range of lengths. Further, in embodiments where the support stand 100 is foldable or otherwise collapsible, the locking mechanism 138 can secure the housings 118/120 in their folded configuration. More specifically, when the locking mechanism 138 is engaged and the housings 118/120 are positioned in a folded configuration, the locking mechanism can ensure that the housings do not lift up until the locking mechanism is disengaged.

Telescoping Rail Locking Mechanism

In some embodiments, the locking mechanism 138 on a telescopic rail 106 can include a lever 144 and a sheath 146. The lever 144 may be rotatably connected to the sheath 146 such that a first portion of the lever rotates relative to the portion of the sheath surrounding the outer rail 140 and a second portion of the lever rotates relative to the portion of the sheath surrounding the inner rail 142. However, the locking mechanism 138 may be located on only a single rail portion (for example, only the outer rail 140 or only the inner rail 142). The lever 144 can further include a wedge 148 located near the top of the second portion of the lever that is surrounding the inner rail 142, as illustrated in FIG. 4. As shown in FIG. 4, the sheath 146 can fixedly attach to an end of the outer rail 140 and slidingly surround a portion of the inner rail 142 to guide it into and out of the outer rail, thereby allowing the rails 106 to telescope. Additionally, the sheath 146 can include a window 150 that exposes a portion of the inner rail 142 and through which the wedge 148 from the lever 144 can make contact with the inner rail, thereby locking the telescoping rail 106 in place. Therefore, as illustrated in FIG. 5, the sheath 146 can effectively connect the outer rail 140 to the inner rail 142, the lever 144 can rotatably connect to a wide enough portion of the sheath such that the lever spans across a portion of the outer rail and the inner rail, and the sheath can have a window 150 that exposes the inner rail 142 and enables the wedge 148 from the lever to, when rotated, come into contact with the inner rail and create a friction lock to prevent further length adjustment of the telescoping rails.

The locking mechanism 138 can also function to lock the entire adjustable support stand 100 in its folded/collapsed configuration. For example, when the front housing 118 and rear housing 120 are horizontal and in their folded configuration, the lever 144 can be rotated into its locking position wherein the wedge 148 creates a friction lock with the inner rail 142 and effectively prevents the supports 102/104 from unfolding and inadvertently transitioning to their upright configurations. As illustrated in FIG. 2, the lever 144 on each of the telescoping rails 106 places pressure on whichever of the front and rear support 102/104 is folded on top of the other. In the illustrated example, the rear support 104 is folded on top of the front support 102 and, therefore, a first lever 144 places pressure on the rear housing 120 and a second lever 144 places pressure on the rear base 126. However, it is anticipated that the front support 102 may be folded on top of the rear support 104 and, therefore, the first lever 144 could place pressure on the front housing 118 and a second lever 144 could place pressure on the front base 124.

Static Rail

As mentioned above, the rails can also be static rails 206 that may be hollow and open on at least one end, as illustrated in FIGS. 11-12, such that the rails themselves, can be used as a storage compartment. In some embodiments, the adjustable support stand 200 has rails 206, but instead of the base 224 and housing 218 of each support being positioned at the end of the rails, one of the supports (for example, the front support 202) can be slidingly connected to the rails while the other of the supports (for example, the rear support 204) can be fixed at or near one end of the rails, as illustrated in FIG. 11. Therefore, as opposed to adjusting the length of the rails to move the supports closer to and further away from each other, one of the supports 202 can be moved along the rails 206 to be positioned closer to and further away from the other support 204.

In this embodiment, as illustrated in FIG. 11, the front of the rails 206 can be attached to a front foundation end 230 and the rear of the rails can be attached to a rear foundation end 232. Further, the front base 224 of the front support 202 may have rail connectors 238 so that the entire front support 202 can slide along the rails 206, whereas the rear base 226 can be fixed in place at the other end of the adjustable support stand 200 (for example, mounted on top of the rear foundation end 232). As mentioned above, "front" and "rear" can be used interchangeably, so while this example illustrates a front support as being slidable along the rails, it is possible that a rear support may be slidable along rails while a front support is fixed. In some embodiments, not only can the rail connectors 238 slide along the rails 206, they can also separate from the rails. For example, the rail connectors 238 may be comprised of a separable portion 278 can, when separated from the remainder of the base 224, enables the base to separate from the rails. In some cases, separable means that the separable portion 278 can completely detach. In other cases, it can mean that the separable portion can simply pivot open along a hinge.

Front Support Rail Locking Mechanism

The rail connectors 238 can be integral to the base 224, as illustrated in FIG. 11, or they can be components that otherwise attach to or engage with the base. In the example illustrated in FIG. 11, the rail connectors 238 are tube-like additions to the bottom portion of the front base 224 and, as illustrated, the front base can be primarily situated between and above the rail connectors. Each rail connector 238 can have a cylindrical interior surface with which it can engage a rail 206. In some embodiments, the exterior surface is also at least partially cylindrical. However, the exterior surface can take any shape. The rail connectors 238 can engage with a rail locking mechanism (for example, a spring-based brake 270) located on the front base 224 such that when the spring-based brake is engaged, the rail connectors may not freely slide along the rails 206.

The spring-based brake 270 can interface with a rail biasing lock button 240 on a front portion 224a of the front base 224 that, when pushed or otherwise engaged, releases a rail brake 272 from contact with a rail 206 and enables the front support 202 to slide toward or away from the rear support 204. More specifically, the spring-based brake 270 can include a rail brake 272 having an upper portion in contact with the rail biasing lock button 240, a lower connection end 274, and a spring 276b, as illustrated in FIG. 13, wherein the connection end is configured to make contact with a rail 206 and to frictionally retain the front support 202 in its position on the rails. The connection end 274 can be on a front portion of the rail brake 272 and can be arcuate in shape to maximize surface area contact with the rail 206, as illustrated in FIG. 15. The spring 276b of the rail brake 272 can be a compression spring that is located on a back side of the rail brake and opposes compression force placed on it when the front portion of the rail brake (for example, the connection end 274) is removed from contact with the rail 206. Therefore, the rail brake 272, in its default configuration, can retain a frictional connection with the rail 206. An upper spring 276a can be located on a back portion of the rail biasing lock button 240, as illustrated in FIG. 15, and can be a compression spring so that when the button is released, the spring pushes the button back into its original configuration.

Therefore, when the rail biasing lock button 240 is compressed, it pushes on the upper spring 276a and pushes on the upper portion of the rail brake 272 to pull the rail brake away from its default position. This movement of the rail brake 272 pulls the connection end 274 away from the rail 206 and compresses the lower spring 276b. When the rail biasing lock button 240 is released, the upper spring 276a and lower spring 276b both push against the compression force to put the rail biasing lock button and rail brake 272, respectively, back into their default configuration.

The rail biasing lock button 240 may be a single biasing component on one side of a front portion of the front base 224 or, alternatively, it may be two components (one on each side of the front base) that are simultaneously pushed. Once the rail biasing lock button 240 is released, the rail connectors 238 can feely slide along the rails, thus allowing the distance between the front support 202 and rear support 204 to be adjusted. To reengage the rail brake 272, the rail biasing lock button 240 can be released, which can then allow the rail brake to have a friction connection with the rail 206 and prevent further movement along the rail.

Height Adjustability

The front base 224, in addition to having rail connectors 238, can connect to the front housing 218 such that the front housing is height adjustable. More specifically, as mentioned above, the front housing 218 may include a height adjustment mechanism that enables it to be height-adjustable relative to the front base 224. To accommodate the vertical adjustment, the front housing 218 can be configured such that it is approximately y-shaped, as illustrated in FIGS. 11-12, with the front grip 208 secured in the upper portion of the front housing and the shaft 242 of the front housing slidable through the front base 224 (for example, a back portion 224b of the base). The height adjustment mechanism can include a height-adjustment button 244 on the front housing 218 for a lock and pin mechanism.

Generally, the height-adjustment button 244 can be a spring-activated push button that can be pushed into a portion of the front housing 218 in order to release the front housing from a locked position within the front base 224. More specifically, the height adjustment mechanism can include a height-adjustment button 244 with an interior end 284, a vertical rocker 286 having an upper portion 286a and a lower portion 286b, a spring 288, a pin 280 and at least one pin hole 282. The interior end 284 of the height-adjustment button 244 can be located within the shaft 242 and can be engaged with the upper portion 286a of the vertical rocker 286, as illustrated in FIG. 14, and the lower portion 286b of the vertical rocker can be engaged with a pin 280. For example, the lower portion 286b may have a rounded, thinner extension that can insert into an opening on a first end of the pin 280. The pin 280 can be located primarily within the shaft 242 with a portion (for example, a second end) at least partially insertable through the shaft and into a pin hole 282 in the rear portion of the front base 224. In some embodiments, there are multiple pin holes 282 aligned vertically within the front base 224, as illustrated in FIG. 14.

Therefore, in use, when the height-adjustment button 244 is pushed inward, the interior end 284 pushes against the upper portion 286a of the vertical rocker 286, which causes the vertical rocker to pivot at a point between the upper portion and the lower portion 286b. This pivot causes the lower portion 286 of the vertical rocker 286 to move away from a center of the shaft 242 and to, accordingly, pull the pin 280 out of a pin hole 282. Once the height-adjustment button 244 releases the pin 298 from its engaged position in the pin hole 296, it allows the front housing 218 to freely move up and down relative to the front base 224 until the height-adjustment button is released. Once released, the spring 288 can push the height-adjustment button 244 back into its default position and can cause the pin 298 to engage with the interior surface of the front base 224 until the shaft 242 is moved up or down to a point where the pin aligns with a pin hole 282 and can insert into the pin hole to lock the front housing 218 in place relative to the front base 224. Therefore, to adjust the height of the front support 202, a user can engage the height adjustment mechanism by pushing and holding the height-adjustment button 244, moving the front housing 218 up and/or down as needed so that the shaft 242 slides through the front base 224, and then releasing the height-adjustment button to retain the desired height of the front housing.

Clamping Mechanism

As mentioned above, the rear support 204 of the embodiment illustrated in FIGS. 11-12 can be comprised of two parallel housing portions 220 that each have a grip 210a and connect, directly or indirectly, to the base 226 and further include a clamping mechanism 266 such that the housing, base, and grip are, collectively, a vise. Therefore, the rear support 204 can be a vise, the rear arms 214c-d can be vise jaws, the rear grip 210 can be vise jaw pads, and the rear housing 220 can be the rigid parallel portions of the arms that can attach to the rear grip (i.e., the vise jaw pads). The housing 220 can directly or indirectly attach to a handle 248, a lever 252 and spring-based clamping mechanism 266. To fix the positioning of the first arm 214d relative to the second arm 214c, the spring-based clamping mechanism 266 can be incorporated with a bar 250 near the bottom of the first arm 214d.

More specifically, the clamping mechanism 266 can be comprised of a clamping lever 252, a release trigger 256, and a spring 257 housed inside a car 254, as illustrated in FIG. 16, that operates to lock the position of the first arm 214d in place at various positions along the bar 250. The clamping lever 252, release trigger 256, and handle 248 can be positioned in line with each other and with the first and second arms 214c/d. Further, the base 226, bar 250, and car 254 upon which the clamping lever 252, release trigger 256, and handle 248 are mounted, can all be positioned in line with each other. The handle 248 can be perpendicular to the first arm 214d, and the release trigger 256 can be positioned between the handle and the clamping lever 252. A bottom portion of the clamping lever 252 and/or the release trigger 256 can be contained within the car 254 and can be engaged with the spring 257 and the bar 250, as illustrated in FIG. 16. As such, when the clamping lever 252 is squeezed toward the handle 248, it can activate the spring-based clamping mechanism 266 and cause the first arm 214d to move toward the second arm 214c.

The clamping lever 252 can include a hollow or partially hollow interior inside which the release trigger 256 can be transiently positioned with the lever is squeezed toward the handle 248. This enables the release trigger 256 to remain in a resting configuration that prevents the first arm 214d from moving away from the second arm even when the clamping lever 252 is squeezed. When the release trigger 256 is activated, it can allow the first arm 214c to move away from the second arm 214c. In some embodiments, each time the clamping lever 252 is squeezed, the first arm 214d can move a predetermined distance towards the second arm 214c. In other embodiments, the first arm 214d is glidingly pushable towards the second arm 214c with or without engagement of the clamping lever 252.

Therefore, in use, the clamping lever 252 can be squeezed toward the handle 248, the release trigger 256 can be transiently positioning inside the clamping lever, and the first arm 214d can move a predetermined distance towards the second arm 214c to clamp an object in place. When the user is ready to release the object, the user can engage the release trigger 256 and the first arm 214d can be slid away from the second arm 214c. In this manner, the width of the rear arms 214c/d can be increased and decreased accordingly.

Scope-Leveling Mechanism

As mentioned above, the rear base 224 can include a scope-leveling mechanism 290. The scope-leveling mechanism 290, as illustrated in FIG. 11, can be comprised of a scope-leveling knob 258 that may be positioned on an outer-facing portion of the rear base 226. In some embodiments, however, the scope leveling knob 258 may be positioned on an inner-facing portion of the rear base 226. The knob 258 can be positioned perpendicular to the bar 250 and can be turned clockwise or counterclockwise to make minor adjustments to the angle of the rear base 226 relative to the rest of the adjustable support stand 200. In some embodiments, the leveling knob 258 can provide continuous, fluid adjustments up to three degrees in either direction (i.e., six degrees total). In other embodiments, the leveling knob 258 can provide pre-determined adjustments at one-degree intervals, up to three degrees in either direction. For example, turning the knob in either direction can result in a one-degree shift, a two-degree shift, or a three-degree shift.

In addition to the knob 258, the scope-leveling mechanism 290 can be comprised of a shaft 268 encompassed on one end by the knob and on the other end by the base 226, as illustrated in FIG. 19. A spring 292 may be positioned on an inner portion of the knob 258 and around one end of the shaft 268, as illustrated in FIG. 18, to retain the knob in a fixed configuration. More specifically, the spring 290 may be a compression spring that functions to constantly pull the knob 258 toward the base 226. Compressing the spring 290 enables the knob 258 to turn from its fixed configuration. Further, in some embodiments, the scope-leveling mechanism 290 can include additional components to retain the knob 258 in a fixed configuration unless it is pulled out far enough to enable rotation. For example, the scope-leveling mechanism can include a base 294 having a pin hole 296 into which a pin 298 on the knob 258, illustrated in FIG. 17, can be inserted, as illustrated in FIG. 19. The pin hole 296 can be near a top portion of the base 294 such that when the pin 298 is inserted into the pin hole, the knob 258 is fixed in place in a relatively vertical configuration. To rotate the knob 258, the knob can be pulled outward away from the base 224 and the spring 290 can be compressed until the pin 298 clears the pin hole 296. If the knob 258 is then turned to a point where the pin 298 and pin hole 296 do not align and released, the spring 290 can continue to hold the knob in place. However, its positioning is less fixed then when the pin 298 is inserted in the pin hole 296.

Storage

As mentioned above, the adjustable support stand can have multiple storage features. For example, the adjustable support stand 100 in FIG. 1 can be easily stored in its collapsed configuration when the front support 102 and rear support 104 are folded over and the telescoping rails 106 are nested together. The adjustable support stand 200 in FIG. 11, while not itself collapsible for storage, contains a plurality of storage features. For example, the foundation 228 can include a foundation front end 230, a foundation rear end 232, and a foundation tray 234. The foundation front end 230 can have a storage mount 264 as well as various trays and cavities, as illustrated in FIGS. 11-12. Additionally, it can contain an open storage compartment 260 on an extension and bit storage 262 on a second extension. Similarly, the foundation rear end 232 can include an open storage compartment 260 on an extension and bit storage 262 on a second extension. The foundation rear end 232 can also include an open rail end 246, as described above, to accept elongate cleaning or maintenance tools. Lastly, the foundation tray 234 itself, located between the foundation front end 230 and foundation rear end 232 can have storage trays and compartments for various tools and cleaning implements. The third embodiment, the adjustable support stand 300 in FIG. 20, can be part of a larger storage case, illustrated in FIG. 21. The case can be designed such that the front support 302 and rear support 304 can be stored in a bottom compartment 336b, as described above, and other various compartments and cavities are structured and configured to hold bits, cleaning tools, cleaning solvents, and other tools and implements for cleaning and maintenance.

Example Support Stand

An adjustable support stand can comprise: a front support 102/202/302 on a first end of the adjustable support stand 100/200/300 having a grip 108/208/308 comprised of a first, front support material; and a rear support 104/204/304 on an opposing, second end of the adjustable support stand having a grip 110/210/310 comprised of a first, rear support material, wherein the front and the rear supports can each have at least two vertical arms 114a-d/214a-d/314a-d, at least one of the supports has vertically stacked chevron voids 116a/216a/316a on each arm, and the chevron voids can be deformable by the object being worked upon to secure and grip the object in place.

The front support 102/202/302 can be further comprised of a housing 118/218/318 having a second, front support material, wherein the second material on the front support can be different than the first material on the front support. The rear support 104/204/304 can be further comprised of a housing 120/220/320 having a second, rear support material, wherein the second material on the rear support can be different than the first material on the rear support. The material surrounding the stacked chevron voids 116a/216a/316a can be at least one of the first, front support material and the first, rear support material. A first of the two grips 110/208/308 can be a stepped V-shape, can be secured within the housing 120/218/318, and can be comprised of thermoplastic or a thermoset rubber. A second of the two grips 108/310 can be V-shaped, can be secured within the housing 118/320, and can be comprised of thermoplastic or a thermoset rubber.

The chevron voids 116a/216a/316a positioned above the object being worked upon can substantially revert back to their original, undeformed shape after insertion of the object being worked upon.

The adjustable support stand 100/300 can be collapsible. The front and rear supports 102/202 and 104/204 can each have a base 124/not visible and 126/326 to which the arms 114a-d/314a-d connect, can have a pin 128/not visible on an outer side of each arm, and can have a vertical track 130/330 on an interior of each side of the base, wherein the pins can sit in the vertical tracks and can be structured and configured to slide along the vertical tracks, and wherein, in the collapsed configuration, each support can be folded over into a horizontal position. The adjustable support stand 100 can further comprise two telescoping rails 106 that connect the front and the rear supports 102 and 104. The adjustable support stand 100 can further comprise a locking mechanism 138 to lock the telescoping rails 106 in place. In the collapsed configuration, the front and the rear supports 102 and 104 can be folded over into a horizontal position and the locking mechanism 138 can further lock the front and the rear supports in place.

The adjustable support stand 100/200 can further comprise two rails 106/206 between the front and the rear supports 102/202 and 104/204. At least one of the front and the rear supports 202 and 204 can be slidable on the rails 206 to expand the distance between the supports.

The adjustable support stand 100/200 can further comprise height adjustable feet 136/236 attached to a bottom of the stand.

The method of using an adjustable support 100/200/300 can comprise: adjusting the support stand to accommodate an object to be worked upon, wherein the support stand can have a front support 102/202/302 with a grip 108/208/308 comprised of a first, front support material, wherein the support stand can have a rear support 104/204/304 with a grip 110/210/310 comprised of a first, rear support material, wherein the front and the rear supports can each have at least two vertical arms 114a-d/214a-d/314a-d, and wherein at least one of the supports can have vertically stacked chevron voids 116a/216a/316a on each arm; placing a front portion of the object to be worked upon into the front support; and placing a rear portion of the object to be worked upon into the rear support, wherein the chevron voids can be deformable by the object being worked upon to secure and grip the object in place.

A collapsible support stand 100 can comprise: a front support 102 on a first end of the adjustable support stand; a rear support 104 on an opposing, second end of the adjustable support stand; two telescoping rails 106 that can connect the front and the rear supports; and a locking mechanism 138 to lock the telescoping rails in place; wherein, in the collapsed configuration, the front and the rear supports can be folded over into a horizontal position and the locking mechanism can further lock the front and the rear supports in place.

The front support 102 can have a grip 108 comprised of a first, front support material, the rear support 104 can have a grip 110 comprised of a first, rear support material, the front and the rear supports can each have at least two vertical arms 114a-d, at least one of the supports can have vertically stacked chevron voids 116a on each arm. The chevron voids 116a can be deformable by an object being worked upon to secure and grip the object in place.

Example Front Support

An adjustable, sliding support can comprise: a shaft 242; two support arms 214a/b attached to the shaft 242; a base 224 in which the shaft 242 mounts; and at least one rail 206 to which the base 224 mounts; wherein the base 224 can include a spring-based brake 270 and a rail biasing lock button 240; and wherein the support can be slidable between a first portion of a support stand toward a second portion of the support stand when the rail biasing lock button 240 is compressed.

The spring-based brake 270 can further comprise a rail brake 272 having a connection end 274 and at least one spring 276a/b (for example: one spring 276a connected to button 240 and one spring 276*b* connected to connection end 274), wherein the connection end 274 can be configured to have a friction connection with the rail 206 when the spring-based brake 270 is engaged with the rail 206. The rail biasing lock button 240 can be in contact with an upper portion of the rail brake 272 and at least one spring 276*a*. Further, pushing the rail biasing lock button 240 can compress the at least one spring 276*a* in contact with the rail biasing lock button 240, and pull the rail brake 272 away from a side of the base 224 and towards a center of the base 224, which can compress the at least one spring 276*a/b* connected to the rail brake 272. The connection end 274 of the rail brake 272 can be arcuate in shape.

The rail biasing lock button 240 is located on a single side of the base 224. A front portion of the base 224*a* can house the spring-based brake 270. A back portion of the base 224*b* can house the shaft 242.

The base 224 can further comprise rail connectors 238 that flank sides of the shaft 242 and the spring-based brake 270, wherein the rail connectors 238 can be structured to be mountable to the at least one rail 206. The rail connectors 238 can be comprised of two rail connectors 238, the at least one rail 206 can be comprised of two rails 206, and the rail connectors 238 can completely encircle the rails 206. The rail connectors 238 can be comprised of a separable portion 278 that, when separated from the remainder of the base 224, enables the base 224 to separate from the rails 206. Separable can mean it completely detaches or it pivots open.

The shaft 242 can further comprise a height-adjustment button 244 that, when engaged, enables the shaft 242 to slide within the base 224. The shaft 242 can further comprise a pin 280 that is directly or indirectly connected to the height-adjustment button 244, the base 224 can further comprise a vertical series of pin holes 282, the pin 280 can have a resting configuration wherein it is inserted in a pin hole 282 from the series of pin holes 282, and engaging the height-adjustment button 244 can remove the pin 280 from the pin hole 282, thereby enabling the shaft 242 to slide within the base 224. The height-adjustment button 244 can be a spring-activated push button, an interior end 284 of the height-adjustment button 244 can be engaged with an upper portion 286*a* of a vertical rocker 286, the pin 280 can be engaged with a lower portion 286*b* of the vertical rocker 286, the vertical rocker 286 can pivot at a point between the upper portion 286*a* and the lower portion 286*b*, and pushing the height-adjustment button 244 can compress a spring 288 and pull the pin 280 away from the resting configuration.

The method of operating a slidable support can comprise: pushing a rail biasing lock button 240 on the slidable support to pull a spring-based brake 270 away from a rail 206, wherein the rail biasing lock button 240 can be connected to a portion of the spring-based brake 270, and the spring-based brake 270 can have a connection end 274 that is configured to make contact with the rail 206; sliding the slidable support along the rail 206; and releasing the rail biasing lock button 240, which can cause the spring-based brake 270 to push the connection end 274 against the rail 206 and secure the support in place. The connection end 274 of the spring-based brake 270 can be arcuate in shape. The slidable support can include a base 224 having rail connectors 238 that flank sides of the base 224, the rail 206 can be comprised of two elongated portions, and each rail connector 238 can be mountable to one of the two elongated portions of the rail 206.

The method can further comprise: pushing a height-adjustment button 244, wherein the height-adjustment button 244 can be located on a shaft 242 of the slidable support and can be connected to a pin 280, the shaft 242 can be slidable within a base 224, the base 224 can be comprised of a series of vertical pin holes 282, and the pin 280 can be removed from a pin hole 282 of the series of pin holes 282 when the height-adjustment button 244 is pushed; sliding the shaft 242 through the base 224 until a predetermined height is reached; and releasing the height-adjustment button 244, wherein releasing the height-adjustment button 244 can enable the pin 280 to insert into a nearest pin hole 282 within the series of pin holes 282, thereby locking the shaft 242 within the base 224. The height-adjustment button 244 can be a spring-activated push button, an interior end 284 of the height-adjustment button 244 can be engaged with an upper portion 286*a* of a vertical rocker 286, the pin 280 can be engaged with a lower portion 286*b* of the vertical rocker 286, the vertical rocker 286 can pivot at a point between the upper portion 286*a* and the lower portion 286*b*, and pushing the height-adjustment button 244 can compress a spring 288 and pull the pin 280 away from the resting configuration.

Example Rear Support

A clamp for a benchtop vise can comprise: a base 226 positioned on top of a portion of the benchtop vise; a support 204 comprised of first and second arms 214*c/d*, a grip 210, and a housing 220, wherein the first and second arms 214*c/d* can be positioned above the base 226, the grip 210 can be comprised of at least two vise jaw pads 210*a*, the housing 220 can be comprised of at least first and second portions, the first arm 214*d* can be comprised of a first housing portion 220 and a first vise jaw pad 210*a*, and the second arm 214*c* can be comprised of a second housing portion 220 and a second vise jaw pad 210*a*; a bar 250 connecting the first and second arms 214*c/d* together, wherein the first arm 214*d* can be positionally adjustable along the bar 250 and the second arm 214*c* can be positionally fixed on the bar; a handle 248 on an outer face of the first housing portion 220; a clamping lever 252 positioned exterior to the handle 248 and in line with the handle 248 and the first and second arms 214*c/d*; and a release trigger 256 positioned between the handle 248 and the clamping lever 252.

The grip 210 can be further comprised of a base pad 210*b*, and the base pad 210*b* can be located on a top portion of the base 226. The first vise jaw pad 210*a* can be attached to an inner face of the first housing portion 220, and the second vise jaw pad 210*a* can be attached to an inner face of the second housing portion 220. The handle 248 can be positioned perpendicularly to the outer face of the first housing portion 220, and the first housing portion 220 of the first arm 214*d* can be parallel to the second housing portion 220 of the second arm 214*c*. The clamping lever 252, when squeezed, can activate a spring-based clamping mechanism 266 that can be incorporated onto the bar 250 and cause the first arm 214*d* to move toward the second arm 214*c*. The release trigger 256 can include a resting configuration that prevents the first arm 214*d* from moving away from the second arm 214*c*. The release trigger 256 can include an activated configuration that allows the first arm 214*d* to move away from the second arm 214*c*. The clamping lever 252 can have a hollow interior inside which the release trigger 256 can be transiently positioned when the clamping lever 252 is squeezed. The handle 248, clamping lever 252, and releaser trigger 256 can be mounted to a car 254 that is slidable along the bar 250, and a spring-based clamping mechanism 266 can be housed inside the car 254.

The clamp further comprise: a scope-leveling mechanism 290 attached to the base 226 and configured to adjust the angle of the base 226 relative to the top portion of the benchtop vise. The scope-leveling mechanism 290 can be positioned perpendicular to the bar 250. The scope-leveling mechanism 290 can be comprised of a knob 258 and a shaft 268. The knob 258 can be turnable in a clockwise or counterclockwise direction to adjust the angle of the clamp up to three degrees in either direction. The shaft 268 can be surrounded on one end by the knob 258 and on the other end by the base 226. The scope-leveling mechanism 290 can include a spring 292 within the knob 258 and around the shaft 268 that retains the knob 258 in a fixed configuration. Compression of the spring 290 can enable the knob 258 to turn from its fixed configuration. The scope-leveling mechanism 290 can further include a base 294 having a pin hole 296, the pin hole 296 can be near a top portion of the base 294 of the scope-leveling mechanism 290, the knob 258 can include a pin 298 that is insertable into the pin hole 296, the knob 258 can be fixed in place when the pin 298 is in the pin hole 296, and pulling the knob 258 can compress the spring 290 and remove the pin 298 from the pin hole 296.

The method of operating a clamp for a benchtop vise can comprise: moving a first arm 214d toward a second arm 214c, wherein a handle 248 can be perpendicularly attached to an outer face of a first housing portion 220 of the first arm 214d, the first housing portion 220 can be positioned opposite a second housing portion 220 of the second arm 214c that can be affixed to a base 226 beneath the second arm 214c, the first and second housing portions 220 can each have a vise jaw pad 210a, a bar 250 can be affixed to the base 226 and can connect the first and second arms 214c/d to each other, the first arm 214d can be positionally adjustable along the bar 250, a clamping lever 252, handle 248, first arm 214d, and second arm 214c can all be positioned in line with each other, and a release trigger 256 can be positioned between the handle 248 and the clamping lever 252 and can be transiently positioned within the clamping lever 252 when the clamping lever 252 is squeezed; and pulling the release trigger 256 toward the clamping lever 252 to activate the release trigger 256 and move the first arm 214d away from the second arm 214c.

Each time the clamping lever 252 is squeezed, the first arm 214d can move a predetermined distance towards the second arm 214c. The first arm 214d can be glidingly pushable towards the second arm 214c. The base 226, bar 250, and a car 254 upon which the clamping lever 252, release trigger 256, and handle 248 are mounted, can all be positioned in line with each other. A resting configuration of the release trigger 256 can prevent the first arm 214d from moving away from the second arm 214c.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. An adjustable support stand comprising:
   a front support on a first end of the adjustable support stand having a grip comprised of a first, front support material; and
   a rear support on an opposing, second end of the adjustable support stand having a grip comprised of a first, rear support material,
   wherein
   the front and the rear supports each have at least two vertical arms,
   at least one of the supports has vertically stacked chevron voids defined by each arm,
   the chevron voids are deformable,
   the front support is further comprised of a housing having a second, front support material, wherein the second material on the front support is different than the first material on the front support,
   the rear support is further comprised of a housing having a second, rear support material, wherein the second material on the rear support is different than the first material on the rear support, and
   a material surrounding the stacked chevron voids is at least one of the first, front support material and the first, rear support material.

2. The adjustable support stand of claim 1, wherein a first of the two grips
   is a stepped V-shape,
   is secured within the housing, and
   is comprised of thermoplastic or a thermoset rubber.

3. The adjustable support stand of claim 2, wherein a second of the two grips is V-shaped,
   is secured within the housing, and
   is comprised of thermoplastic or a thermoset rubber.

4. The adjustable support stand of claim 1 in combination with an object being worked upon, wherein
   at least one chevron void on each arm is positioned above the object being worked upon, and
   the chevron voids positioned above the object being worked upon substantially revert back to their original, undeformed shape after insertion of the object being worked upon.

5. The adjustable support stand of claim 1, wherein the adjustable support stand is collapsible into a collapsed configuration.

6. The adjustable support stand of claim 5, wherein the front and rear supports each
   have a base to which the arms connect,
   have a pin on an outer side of each arm, and
   have a vertical track on an interior of each side of the base, wherein the pins sit in the vertical tracks and are structured and configured to slide along the vertical tracks, and wherein, in the collapsed configuration, each support is folded over into a horizontal position.

7. The adjustable support stand of claim 5, further comprising two telescoping rails that connect the front and the rear supports.

8. The adjustable support stand of claim 7, further comprising a locking mechanism to lock the telescoping rails in place.

9. The adjustable support stand of claim 8, wherein in the collapsed configuration, the front and the rear supports are folded over into a horizontal position and the locking mechanism further locks the front and the rear supports in place.

10. The adjustable support stand of claim 1, further comprising two rails between the front and the rear supports.

11. The adjustable support stand of claim 10, wherein at least one of the front and the rear supports is slidable on the rails to expand the distance between the supports.

12. The adjustable support stand of claim 1, further comprising height adjustable feet attached to a bottom of the stand.

13. A method of using an adjustable support stand, the method comprising:
adjusting the support stand to accommodate an object to be worked upon, wherein
the support stand has a front support with a grip comprised of a first, front support material,
the support stand has a rear support with a grip comprised of a first, rear support material,
the front and the rear supports each have at least two vertical arms, and
at least one of the supports has vertically stacked chevron voids defined by each arm;
placing a front portion of the object to be worked upon into the front support; and
placing a rear portion of the object to be worked upon into the rear support,
wherein
the chevron voids are deformable by the object being worked upon to secure and grip the object in place,
the front support is further comprised of a housing having a second, front support material, wherein the second material on the front support is different than the first material on the front support,
the rear support is further comprised of a housing having a second, rear support material, wherein the second material on the rear support is different than the first material on the rear support, and
a material surrounding the stacked chevron voids is at least one of the first, front support material and the first, rear support material.

14. A collapsible support stand comprising:
a front support on a first end of the collapsible support stand;
a rear support on an opposing, second end of the collapsible support stand;
two telescoping rails that connect the front and the rear supports; and
a locking mechanism attached to at least one of the telescoping rails that is structured and configured to lock the telescoping rails in place;
wherein the collapsible support stand is in a collapsed configuration when the front and the rear supports are folded over into a horizontal position, and
wherein, when the front support and the rear support are folded over into the horizontal position, the locking mechanism locks the front and the rear supports in the horizontal position by placing pressure on one of the front support and the rear support.

15. The collapsible support stand of claim 14, wherein
the front support has a grip comprised of a first, front support material,
the rear support has a grip comprised of a first, rear support material,
the front and the rear supports each have at least two vertical arms,
at least one of the supports has vertically stacked chevron voids on each arm.

16. The collapsible support stand of claim 15, wherein the chevron voids are deformable by an object being worked upon to secure and grip the object in place.

* * * * *